US009288052B2

(12) United States Patent
Prafullchandra et al.

(10) Patent No.: US 9,288,052 B2
(45) Date of Patent: Mar. 15, 2016

(54) METHOD AND APPARATUS TO PROVIDE AN AUTHORING TOOL TO CREATE CONTENT FOR A SECURE CONTENT SERVICE

(75) Inventors: Hemma Prafullchandra, Mountain View, CA (US); Michael Graves, Chaska, MN (US); Ryan Emory Lundberg, Providence, RI (US); Hans Granqvist, San Jose, CA (US); Gary Krall, Saratoga, CA (US)

(73) Assignee: Moreover Acquisition Corporation, Vienna, VA (US)

( * ) Notice: Subject to any disclaimer, the term of this patent is extended or adjusted under 35 U.S.C. 154(b) by 1813 days.

(21) Appl. No.: 11/591,365

(22) Filed: Oct. 31, 2006

(65) Prior Publication Data

US 2007/0256143 A1 Nov. 1, 2007

Related U.S. Application Data

(60) Provisional application No. 60/792,095, filed on Apr. 13, 2006.

(51) Int. Cl.
*H04L 9/32* (2006.01)
*H04N 21/2347* (2011.01)
*H04N 21/266* (2011.01)

(52) U.S. Cl.
CPC ............ *H04L 9/321* (2013.01); *H04N 21/2347* (2013.01); *H04N 21/26613* (2013.01); *H04L 2209/60* (2013.01)

(58) Field of Classification Search
USPC .............................. 726/2, 3, 4, 16, 17, 26–31
See application file for complete search history.

(56) References Cited

U.S. PATENT DOCUMENTS

| 5,263,158 | A  | * | 11/1993 | Janis ................................. 707/1 |
| 5,864,667 | A  |   | 1/1999  | Barkan |
| 6,253,202 | B1 |   | 6/2001  | Gilmour |
| 6,324,650 | B1 | * | 11/2001 | Ogilvie ............................ 726/2 |
| 6,671,818 | B1 | * | 12/2003 | Mikurak ........................... 714/4 |
| 7,080,077 | B2 |   | 7/2006  | Ramamurthy et al. |
| 7,281,263 | B1 | * | 10/2007 | LaMastres et al. ............... 726/2 |
| 7,577,253 | B2 | * | 8/2009  | Schipper ............ G06Q 20/1235 380/231 |
| 8,458,739 | B2 | * | 6/2013  | Thomas ........................... 725/2 |
| 2002/0091745 | A1 |   | 7/2002  | Ramamurthy et al. |
| 2002/0091975 | A1 |   | 7/2002  | Redlich et al. |
| 2003/0005326 | A1 |   | 1/2003  | Flemming et al. |

(Continued)

OTHER PUBLICATIONS

Protection system for MPEG-2 streaming media, Kim et al, IEEE 2004.*

(Continued)

*Primary Examiner* — Luu Pham
*Assistant Examiner* — Jahangir Kabir
(74) *Attorney, Agent, or Firm* — Dinsmore & Shohl LLP

(57) ABSTRACT

A method and apparatus to provide an authoring tool enabling a user to create content and to selectively encrypt content is described. The encryption is designed to associate an entitlement with the content, the entitlement restricting access to the content. The system in one embodiment further includes a reading tool to access various content, the reading tool to enable an integrated reading of clear-text content and encrypted content. The system, in one embodiment, is designed to interact with a secure content service to provide a decryption key when an authorized user wishes to access the encrypted content.

7 Claims, 16 Drawing Sheets

(56) References Cited

U.S. PATENT DOCUMENTS

| | | | |
|---|---|---|---|
| 2003/0079120 | A1 | 4/2003 | Hearn et al. |
| 2003/0154406 | A1 | 8/2003 | Honarvar et al. |
| 2003/0233439 | A1 | 12/2003 | Stone et al. |
| 2004/0042506 | A1 | 3/2004 | Fallon et al. |
| 2004/0054920 | A1 | 3/2004 | Wilson et al. |
| 2004/0123135 | A1* | 6/2004 | Goddard ................. 713/200 |
| 2004/0268125 | A1* | 12/2004 | Clark et al. ................. 713/166 |
| 2005/0004875 | A1 | 1/2005 | Kontio et al. |
| 2005/0039034 | A1 | 2/2005 | Doyle et al. |
| 2005/0060565 | A1* | 3/2005 | Chebolu et al. ............... 713/200 |
| 2005/0060580 | A1* | 3/2005 | Chebolu et al. ............... 713/201 |
| 2005/0135618 | A1* | 6/2005 | Aslam et al. ................. 380/212 |
| 2005/0154608 | A1* | 7/2005 | Paulson et al. ................... 705/1 |
| 2005/0192904 | A1 | 9/2005 | Candelore |
| 2005/0207569 | A1* | 9/2005 | Zhang et al. ..................... 380/28 |
| 2005/0276416 | A1 | 12/2005 | Zhu et al. |
| 2006/0010323 | A1 | 1/2006 | Martin et al. |
| 2006/0137015 | A1* | 6/2006 | Fahrny et al. .................. 726/26 |
| 2006/0291803 | A1* | 12/2006 | Watson .................. H04N 5/781 386/231 |

OTHER PUBLICATIONS

ACL-based data storage controlling the access from processes in DRM client environment, Nam et al IEEE 2004.*

Adapting encrypted data streams in open architectures, Reiher et al, IEEE 2001.*

The International Search Report and the Written Opinion, mailed on Feb. 15, 2008, issued in related International Patent Application No. PCT/US07/08383, filed Apr. 5, 2007.

The International Search Report and the Written Opinion, mailed on Feb. 15, 2008, issued in related International Patent Application No. PCT/US07/08381, filed Apr. 5, 2007.

The International Search Report and the Written Opinion, mailed on Jul. 11, 2008, issued in related International Patent Application No. PCT/US07/08382, filed Apr. 5, 2007.

Office Action mailed on Jun. 25, 2008 in related U.S. Appl. No. 11/591,206.

USPTO Office Action of Sep. 14, 2009 in connection with U.S. Appl. No. 11/590,970 (11 pgs.).

Frederick Giasson, "SWFP: Secure Web Feed Protocol," available at http://fgiasson.com/articles/swfp.com, last visited Apr. 24, 2007.

OpenID, "Spec Process," available at http://openid.net/specs.bml, last visited Apr. 24, 2007.

D. Recordon et al., "OpenID Authentication 1.1," available at http://openid.net/specs/openid-authentication-1_1.html, last visited Apr. 24, 2007.

J. Hoyt et al., "OpenID Simple Registration Extension 1.0," available at http://openid.net/specs/openid-simple-registration-extension-1_0.html, last visited Apr. 24, 2007.

Joaquin Miller, ed., "Yadis Specification Version 1.0," Mar. 18, 2006, available at http://yadis.org/papers/yadis-v1.0.pdf, last visited Apr. 24, 2007.

OpenID.net, "OpenID Authentication 2.0—Draft 11," available at http://openid.net/specs/openid-authentication-2_0-11.html, last visited Apr. 24, 2007.

G. Monroe et al., "OpenID Service Key Discovery 1.0—Draft 01," available at http://openid.net/specs/openid-service-key-discovery-1_0-01.html, last visited Apr. 24, 2007.

G. Monroe et al., "OpenID DTP Messages 1.0—Draft 03," available at http://openid.net/specs/openid-dtp-messages-1_0-03.html, last visited Apr. 24, 2007.

D. Hardt et al., "OpenID Attribute Exchange 1.0—Draft 04," available at http://openid.net/specs/openid-attribute-exchange-1_0-05.html, last visited Apr. 24, 2007.

D. Hardt, "OpenID Attribute Types—Draft 02," available at http://openid.net/specs/openid-attribute-types-1_0-02.html, last visited Apr. 24, 2007.

D. Hardt, "OpenID Attribute Metadata—Draft 01," available at http://openid.net/specs/identity-attribute-metadata-1_0-01.html, last visited Apr. 24, 2007.

D. Recordon et al., "OpenID Assertion Quality Extension 1.0—Draft 3," available at http://openid.net/specs/openid-assertion-quality-extension-1_0-03.html, last visited Apr. 24, 2007.

J. Hoyt et al., "OpenID Simple Registration Extension 1.1—Draft 1," available at http://openid.net/specs/openid-simple-registration-extension-1_1-01.html, last visited Apr. 24, 2007.

OpenID, "OpenID Authentication 1.1," available at http://openid.net/specs/specs-1.1.bml, last visited Apr. 24, 2007.

OpenID, "OpenID Authentication 1.0," available at http://openid.net/specs/specs-1.0.bml, last visited Apr. 24, 2007.

Laurentiu Cristofor, "SQL Server 2005: column encryption demo part 2," available at http://blogs.msdn.com/lcris/archive/2005/06/10/428178.aspx, last visited Apr. 24, 2007.

* cited by examiner

| User Profile ID 1210 | |
|---|---|
| Name 1220 | TPV |
| Date of Birth 1225 | TPV |
| Address 1230 | |
| Gender 1235 | TPV |
| Pseudonyms 1245 | |
| Credit Card 1250 | TPV |
| Hobbies 1255 | |
| Extensible 1290 | |
| AnomalousActivityAlerts 1260 | |
| Real-time alerts 1265 | |
| Access Granularity Definition 1285 | |
| Transactional Data 1270 <dynamically retrieved from Events database> | |
| Behavioral Data 1275 | TPV |
| Reputation Data 1280 <fact based/hearsay> | TPV |
| Dynamic Groups 1295 | |
| Content Filters 1299 | |

Fig. 12

METHOD AND APPARATUS TO PROVIDE AN AUTHORING TOOL TO CREATE CONTENT FOR A SECURE CONTENT SERVICE

RELATED CASES

This application claims the benefit of U.S. Provisional Patent Application Ser. No. 60/792,095 filed Apr. 13, 2006, entitled "A Method and Apparatus to Provide Content Access with a Secure Content Service"

FIELD OF THE INVENTION

The present invention relates to providing content access, and more particularly to providing secure content access.

BACKGROUND

As more data is becoming available on the Internet, providing secure access to data is becoming more difficult. Blogging services such as LiveJournal, attempt to provide some security. Most such services enable you to set the security level of entries when they are posted or edited. Generally speaking, the security levels include public access, access by named friends or friend groups, and custom access. This type of security is enforced by using cookies stored in a visitor's web browser to track who is logged in and show only those entries that the visitor is authorized to see. This creates a "walled garden" method of security. However, it is impossible to create such security for a blog (web log) which permits RSS (Really Simple Syndication) or other syndication, short of using "all or nothing" methods such as .htaccess. Once content is released onto the Internet, it is generally considered insecure by its nature.

Atom is an XML-based document format and HTTP-based protocol designed for the syndication of Web content such as web logs and news headlines to Web sites as well as directly to user agents. Atom defines a framework for encryption, following the XML Encryption Syntax and Processing W3C Recommendation 10 Dec. 2002, described at <http://www.w3.org/TR/xmlenc-core/>

Generally speaking, handling the decryption key is the most difficult part. There are two options: (secret) key exchange or using public key encryption. The content creator and content consumer can exchange symmetric keys, using various configurations. For example, a masked key may be included in the content. Alternatively, the creator can encrypt the content with the consumer's public key, ensuring that only the consumer (possessor of the private key) can decrypt it. However, both of these options suffer from the flaw that they require individual set-up for the encryption for each recipient. This makes the encryption option cumbersome.

SUMMARY OF THE INVENTION

A system to provide selective encryption controls for content is described. The system comprises a secure content service to encrypt and decrypt selected portions of the content, and to verify entitlement of a content consumer to the encrypted portions of the content. In one embodiment, the secure content service comprises a receiving logic to receive a content identification identifying a particular encrypted content element from a content consumer, the content identification having an associated entitlement. The secure content service further includes authorization logic to compare the entitlement with the content consumer's information, and determine whether the content consumer is entitled to access the content. The secure content service in one embodiment further includes a key logic to obtain a decryption key associated with the content element, if the content consumer is entitled to access the content.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 is a diagram of one embodiment of a user profile.

DETAILED DESCRIPTION

The method and apparatus described is designed to enable publishing secure, encrypted, content to individual content consumers, or groups of content consumers, without relying on local authentication or access controls. The system, in one embodiment, enables mixing posts with different access controls (including encryption) in a single feed. The system, in one embodiment, specifies a logical name for a distribution list at publish time that can be expanded and/or queried at consumption time. In one embodiment, the system uses a negotiation process between reader and the secure content system server to validate the content consumer and get the decryption key needed to read the encrypted post. In one embodiment, the decryption key is a symmetric key which is unique to the particular content unit.

The secure content system enables the distribution of encrypted messages or notifications to aggregators or other feed-readers, desktops and/or mobile systems. (For example, transactions, managed security notifications, and device or appliance notifications.) Even if the content is broadly available in the wild on the Internet, the encryption mechanism ensures that it remains securely under the control of the content creator.

The secure content server system maintains an online profile for each user. In one embodiment, the secure content server uses a unique identifier (e.g. "hemma.verisign.com") as a pointer to the user profile. The user profile is used to indicate the person/resource that is authorized to read a post (as opposed to locking down a post with an inline username/password combo), as well as for other identity and validation purposes. This system enables authentication of users cross-service (or cross-publisher) for the purpose of viewing secured, encrypted, or signed content in a web browser or aggregator.

In one embodiment, the secure content server logs each access to a user profile. In one embodiment, this log is available to the user. In one embodiment, the secure content server also treats users' online identity as equivalent to a 'bank card' and provides similar monitoring and real-time alerting services of usage activity and anomalous activity. Furthermore, while the profile may contain comprehensive data, in one embodiment the user is provided fine-grained access control over the profile data. In one embodiment, the user may grant access to his or her profile to requesters on a case-by-case basis, one-time, for a specified period of time, for a specific number of accesses, or forever. Requesters may include API (application program interface) calls from applications seeking to authenticate/validate the user, users wishing to view the profile through a web interface, or other access requests.

Figure 1A:
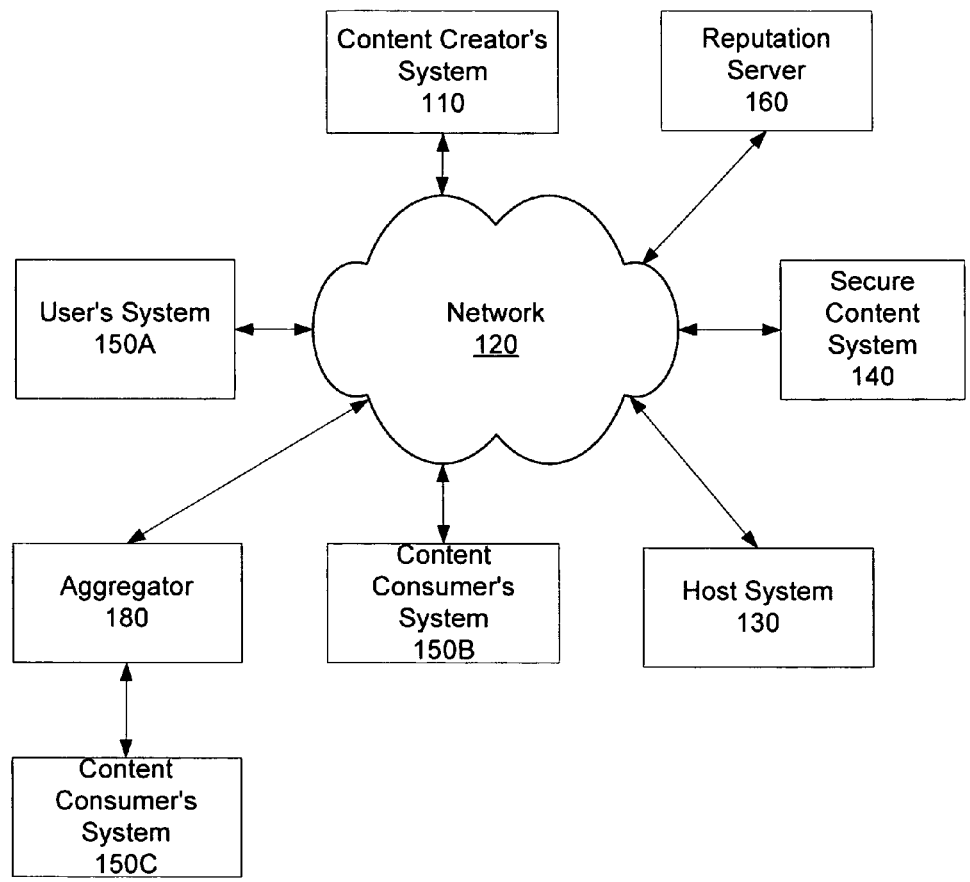
FIG. 1A is a network diagram illustrating one embodiment of the system.

FIG. 1A is a network diagram illustrating one embodiment of the system. The network includes a secure content system 140. In one embodiment, a separate reputation server 160 is coupled to network 120, to provide reputation data associated with a user profile stored in secure content system 140.

Various authors, or content creators 110 may create content. This content is generally hosted on host system 130. The host system 130 may be the same system as the content creator's system 110, or may be remote from the content creator. In this document, the terms "content creator" and "author" are used interchangeably. Furthermore, the content created by content creator may be in any format. For example, the content may be text, image, video, audio, and/or a combination. Furthermore, the term "content creator" does not imply that the content is original. A content creator may simply be someone who submits content to a host system 130, or makes that content available to content consumers. A content consumer can be any individual, group, or application which accesses such content.

In addition to having the content made available by content creator on host system 130, aggregator 180 may gather data from host system 130, or multiple systems, and make it available to content consumers 150C. Examples of this include blog feeds such as RSS, data streaming, content streaming (Podcasts), websites, etc. However, other types of content gathering such as web site scraping, may be included. Once the content is made available on the Internet, it remains associated with the system regardless of who obtains it.

Content consumers 150A, 150B, 150C may consume the content created by content creator 110 either directly from content creator 110, from host system 130, or via aggregator 180, or any other intermediary. In one embodiment, content consumers 150A, 150B, 150C utilize a "reader" 190 as an interface to obtain the content from host system 130, aggregator 180, or another source. In one embodiment the reader may be an Internet browser. Content consumers' access rights to the content is determined based on an entitlement, attached by the content creator to the content. The entitlement lists the access rights to the content. Note that while the specific description herein focuses on providing an entitlement for accessing content, the system may be used for controlling other rights over the content. The rights which may be enforced and limit the use of the content, the entitlement may include one or more of the following: reading, listening, viewing, copying, editing, deleting, republishing, and any other interaction with the content.

In one embodiment, each content consumer and content creator has a profile in the secure content system 140. This profile is used as part of an encryption/decryption/signature mechanism.

Figure 1B:
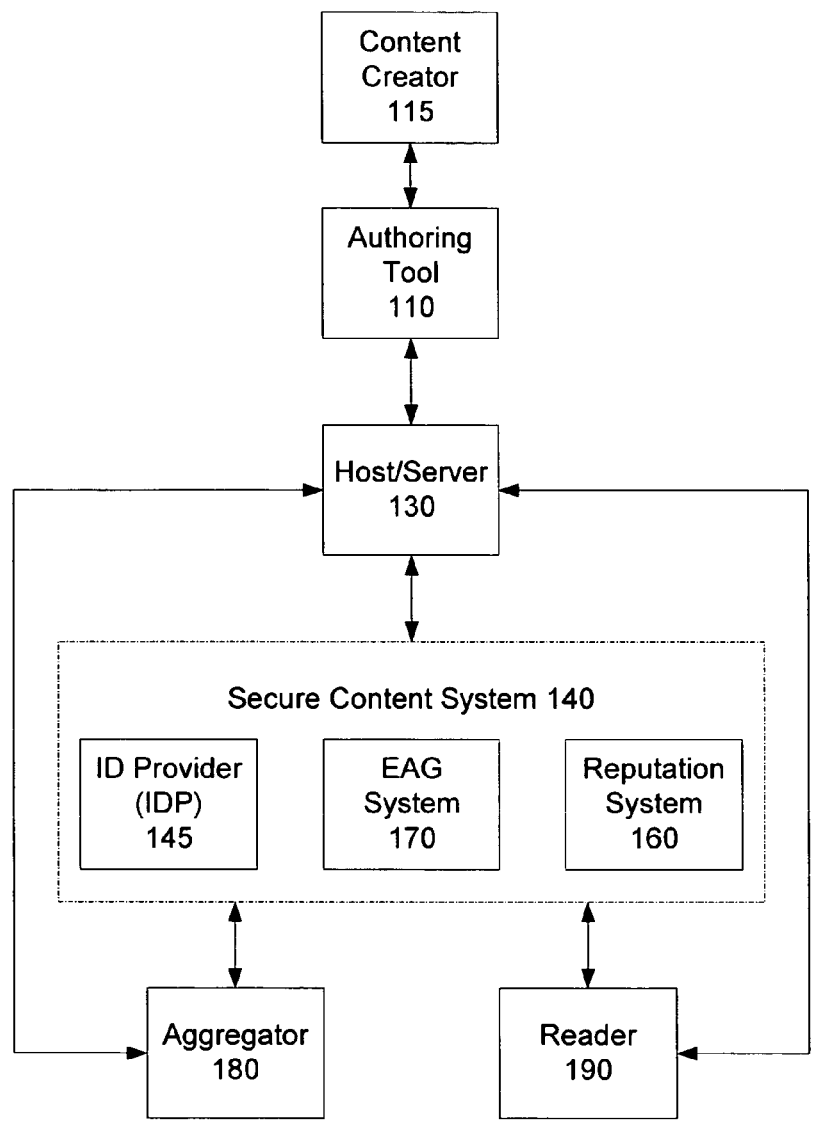
FIG. 1B is a diagram illustrating one embodiment of the communication connections between the elements of the system.

FIG. 1B is a diagram illustrating one embodiment of the communication connections between the elements of the system. The content creator 115 uses authoring tool 110 to create content, which is made available over a network via host/server 130. In one embodiment, the content creator 115 or host server 130 may encrypt the content. Secure content system 140 is used to provide identity/authentication/user profiles/profile management 145, encryption/authorization/group management 170, and reputation system 160.

Aggregator 180 may be an intermediary between a content consumer and host 130. In one embodiment, aggregator 180 may also be an intermediary with the secure content system 140. Reader 190 is used by content consumers to consume content. Note that while the term "Reader" is used, this does not imply that the content is text. Rather, the consumption tools utilized by the content consumers are generically referred to as readers. They may range from computer systems including a browser, special applications, special purpose devices, and handheld devices such as PDAs or Black-Berrys, to any other system that can be used to consume content.

Figure 2:
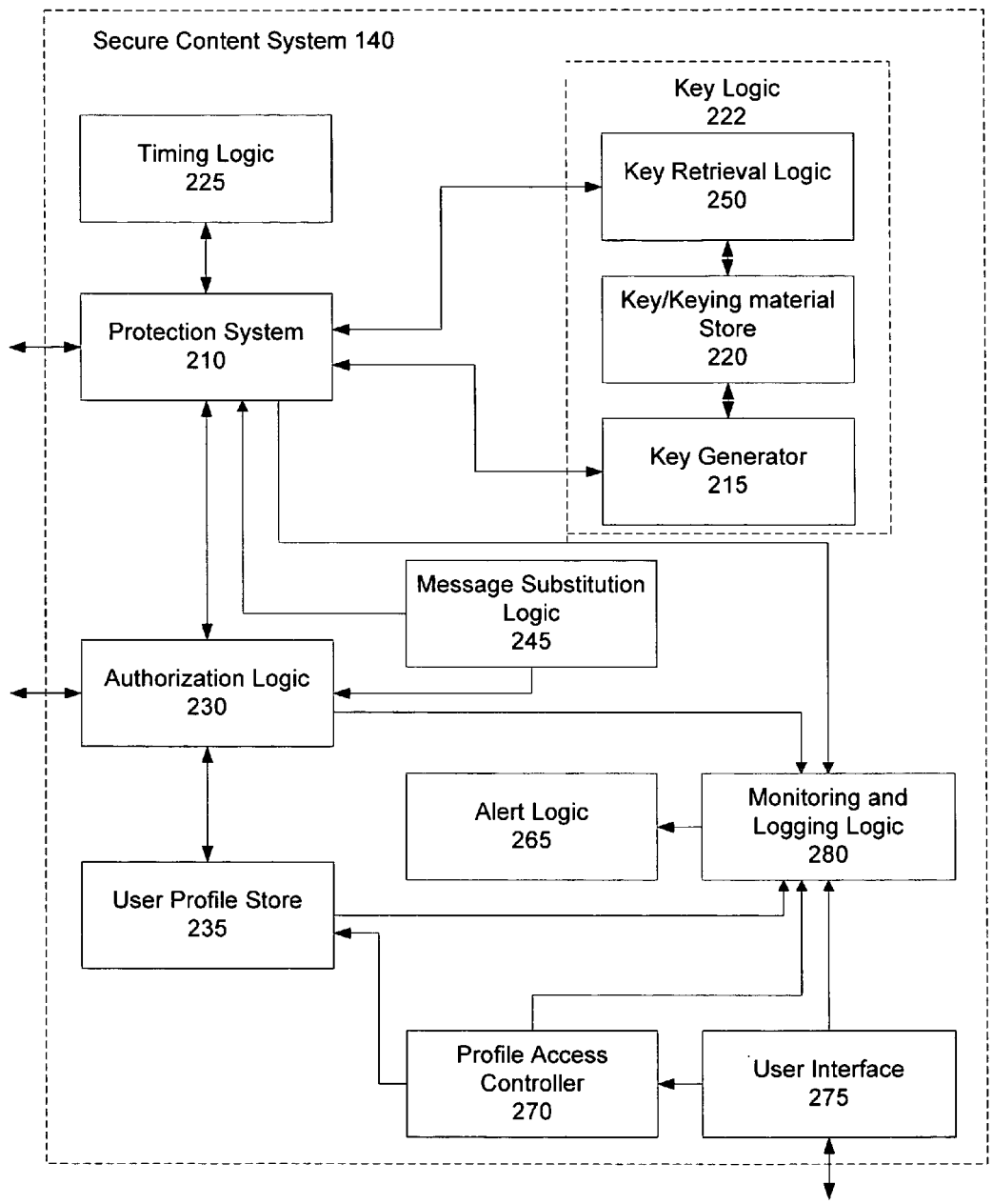
FIG. 2 is a block diagram of one embodiment of the secure content system.

FIG. 2 is a block diagram of one embodiment of the secure content system. A content creator's request for encryption is received by protection system 210. The protection system 210 interacts with key generator 215, to generate the encryption/decryption keys. In one embodiment, the key is a unique symmetric key. Alternatively, the key may be a public/private key pair, a related encryption and decryption key pair, or any other type of key which enables encryption and decryption of content. In one embodiment, protection system 210 also generates a unique content ID for the content. In another embodiment, the authoring system may generate the content ID.

In one embodiment the key is stored in key/keying material store 220, associated with the unique content ID. In another embodiment, a keying material, used to generate the key, is stored in key/keying material store 220. In one embodiment, key generator 215 uses secret knowledge, stored in the key/keying material store 220, to generate, and regenerate, the key on request. In one embodiment, the secret knowledge may be a nonce. In one embodiment, the secret knowledge may be a secret associated with the secure content system. In one embodiment, the secure content system's secret and the unique content ID are together used to generate the key. In one embodiment, therefore, only the unique content ID is stored by the secure content system, and key/keying material store 220 may be eliminated.

A content consumer's request for access is received through authorization logic 230. In one embodiment, the authorization logic 230 utilizes user profile data from profile store 235, and entitlement data associated with the content, to determine whether the content consumer is authorized to access the content. If the content consumer is authorized, protection system 210 uses key logic 222 for decryption. In one embodiment, key logic 222 uses key retrieval logic 250 to retrieve the key associated with the unique content ID from key/keying material store 220. In another embodiment, key generator 215 regenerates the decryption key. The key generation may be based on the keying material available in the key/keying material store 220 and unique content ID, or secret knowledge of the secure content system and the unique content ID. In one embodiment, protection system 210 then uses the key to decrypt the content. In another embodiment, if the content consumer's reader is capable of performing the decryption, protection system 210 returns the key to the reader securely.

Timing logic 225 enables the protection system to attach a time and date related attributes to the entitlement. Entitlements may include timing details, for example "make available until or for time or date" or "do not make available until/for time or date." The timing logic 225 uses the system or network time to create these entitlements on behalf of the content creator. Furthermore, during decryption, the timing logic 225 uses the secure content server's 140 system time or network time to verify whether a time-related entitlement is currently active. This ensures that the content consumer's computer clock does not have an effect, so that a content consumer cannot have access to data, for example by altering the reader's system clock.

Message substitution logic 245 is used to create a substitute message instead of the standard summary message when the message is initially encrypted by protection system 210. The message substitution logic 245 may also provide a customized error message, when access to encrypted content fails. In one embodiment, the message may vary based on the reason for the failure to receive access. In one embodiment, a content creator may customize the substitute messages inserted by message substitution logic 245.

User profile store 235 stores user profiles. In one embodiment, each profile has a unique identifier. The user may set access levels to his or her profile in profile store 235. Profile access controller 270 enables user to set access granularity and preferences. User interface 275 enables access to the user profile, through profile access controller 270. In one embodiment, authorization logic 230 is used for verifying access level to user profiles.

In one embodiment, all accesses to the secure content system are logged by monitoring and logging logic 280. This includes requests for encryption or decryption, requests to access user profiles, etc. In one embodiment, the user profile, when accessed through user interface 275, may pull the data from monitoring and logging logic 280 to provide the user profile log. In one embodiment, the profile accesses may not be shown fully. In one embodiment, the accessing application or user may provide a restricted amount of data. For example, in one embodiment, a user may set his or her "access profile" to display only a limited amount of data. In one embodiment, the content creator may require a certain level of data access in order to provide the content. For example, in a medical context, a doctor may require the full name of the accessing user, as well as their insurance information.

The monitoring and logging logic 280 also monitors the accesses to the system, including user profile accesses. Monitoring and logging logic 280, in one embodiment, uses preferences set by the user. Monitoring and logging logic 280 determines if an access to the user profile is anomalous, or is set to trigger a real-time notification. Alternative monitoring settings may be set. If the monitoring and logging logic 280 determines that the log indicates something requiring an alert, alert logic 265 sends an alert to the user. The alert may be sent in the form set by the user. For example, for real-time alerts, the user may prefer an SMS message, while for anomalous requests the user may prefer email. These preferences are set in the profile itself by the user, in one embodiment. Monitoring and logging logic 280 may also be usable to provide a "proof of delivery" of content. A content creator may log into the system, and utilize the monitoring and logging logic 280 to request the "who and when" of accesses to the content. Providing such auditability of consumption can be very useful. For example, it enables posted content to be used in environments which require read receipts.

Figure 3:
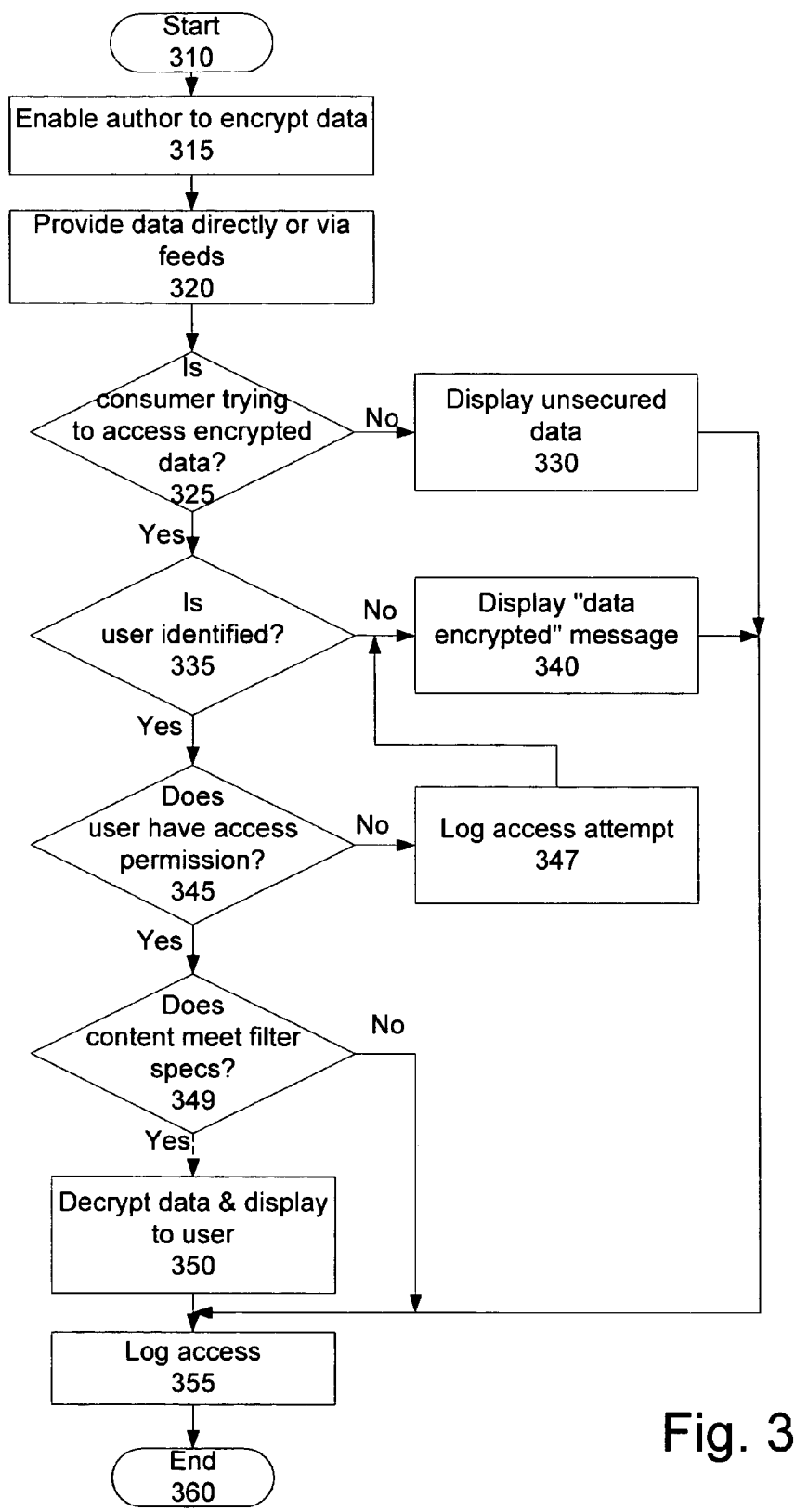
FIG. 3 is an overview flowchart of one embodiment of using the secure content system.

FIG. 3 is an overview flowchart of one embodiment of using the secure content system. The process starts at block 310. In one embodiment, this process starts when a content creator submits content for publication. As noted above, publication in this context means making content available to a content consumer.

At block 315, the system enables the author to encrypt the content, or data. At block 320, the data is provided to various content consumers directly or via feeds, collected by aggregators. In one embodiment, the data is provided simply by posting it to a website on the Internet. In one embodiment, the entitlement associated with the data is provided in clear text form. In another embodiment, the entitlement may be separately encrypted by a secured content key. In one embodiment, the entitlement encryption may be the server's public key, or another type of encryption mechanism. In one embodiment, the entitlement may be protected by indirection.

At block 325, the process determines whether a content consumer is attempting to access encrypted data. In one embodiment, an access attempt is defined as any viewing of content which includes encrypted content. If no encrypted data is being accessed, then the clear text, or unsecured, data is displayed to the content consumer, at block 330. This does not require any interaction with secure content service. However, if the content consumer is attempting to access encrypted data, the process continues to block 335.

At block 335, the process determines whether the content consumer is identified. An identified content consumer has a user profile in the secure content service, and is currently logged into the service. In one embodiment, the process prompts the content consumer to establish the connection with the secure content service prior to making this verification.

If the content consumer is not identified—indicating that the content consumer does not have a profile in the secure content service or that the content consumer did not successfully log into the secure content service—the process continues to block 340. At block 340, a substitute message is displayed to the content consumer. In one embodiment, the substitute message simply indicates that the content is encrypted and not available. The process then ends at block 360.

If the content consumer is identified—i.e. has an associated user profile, and is connected to the user profile—the process continues to block 345. At block 345, the process determines whether the content consumer has access permission to the content. As noted above, the author when encrypting the content can designate access. If the content consumer has permission to access, i.e. is entitled to the content, the process continues to block 349.

At block 349, the process determines whether the content meets the content consumer's filter specifications. In one embodiment, the content consumer can set filters. Filters are a set of rules that modify the incoming set of data to remove used to limit the authors or content types accessed by user. In one embodiment, filters may also be used to limit content accessed based on the entitlements attached to the content. If there are no filters, or the content meets the filter specifications, the process continues to block 350. At block 350, the data is decrypted and displayed to the content consumer. The process then continues to block 355. If the content does not meet the filter specifications, the process continues directly to block 355.

The access is logged, at block 355. In one embodiment, all connections to the secure content service are logged. In one embodiment, while there is a log associated with an individual user profile, that log is not actually coupled, but rather a search pointer into the overall connection log that provides a simple way to access the connections to the user's profile. The process then ends at block 360.

If the content consumer was found not to have access, at block 345, the process continues to block 347. At block 347, the process displays the substitute message. The process then continues to block 355 to log the access attempt. This access log is available via user profiles, or via the accessed message itself. In one embodiment, a content creator can see the access log associated with their content. In one embodiment, a user can see the access log associated with their user profile. This is useful because it enables a content creator to use the system for messages which require read verification. For example, for certain medical notifications, it is useful for a content creator to know with certainty which readers have accessed the notification. This system provides such certainty, via the log.

While this and other processes in this application are described as flowcharts, these steps may be performed in a different order.

Figure 4:
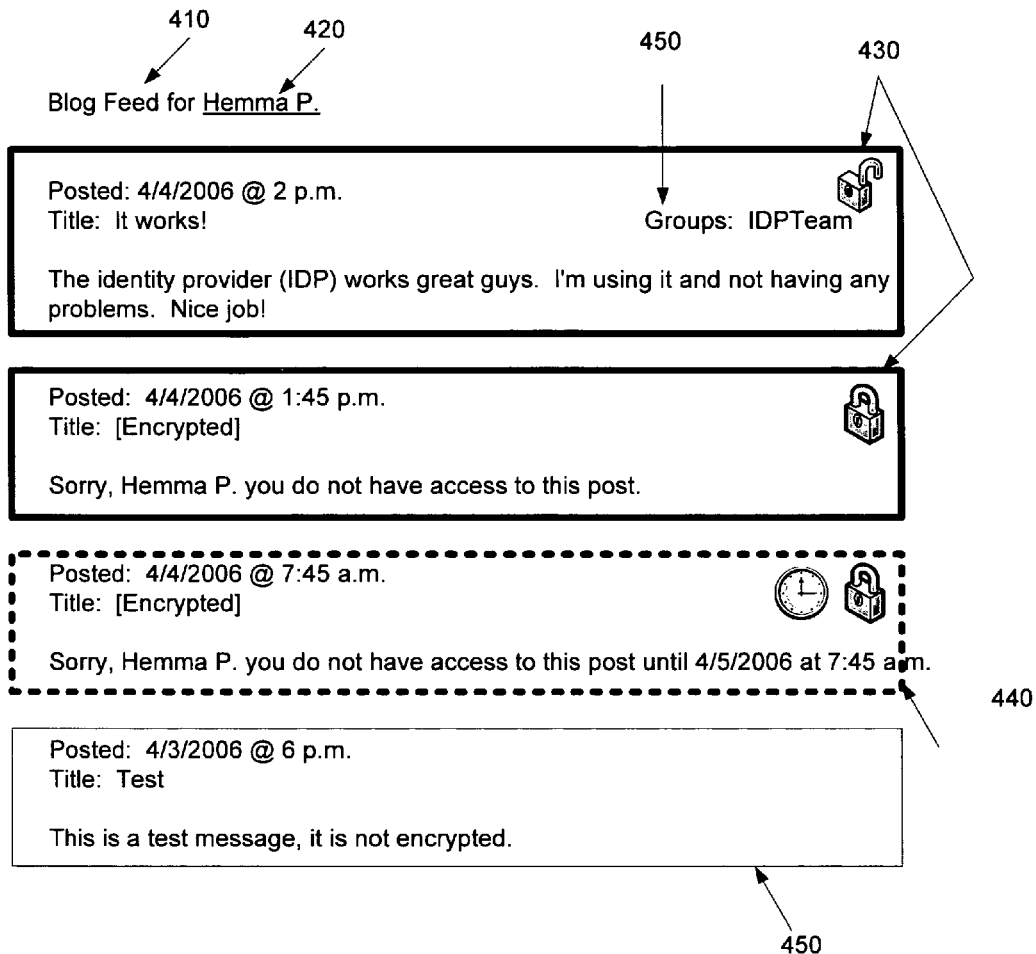
FIG. 4 is an illustration of an exemplary blog display using the secure content system.

Note that while this is described as if each content part were accessed separately by a content consumer, in actuality many consumers obtain a stream of content, known as a feed, from multiple sources, or read a web page containing multiple content parts, some of which may be encrypted. An exemplary display of a feed for content consumer is shown in FIG. 4.

As can be seen, each variety of published content in this listing has an associated status. In one embodiment the encryption status is indicated by the border. The bold bordered content elements are encrypted elements, the dashed border indicates encrypted elements that have a timing attached to them—discussed in more detail below—and the thin border indicates plain text, unencrypted content. In one embodiment, when the content consumer accesses the feed 410, represented here, the secure content service accesses the entitlements attached to each of these content elements, and verifies whether the content consumer 420 has permission to access the content element.

In one embodiment, visual icons 430 indicate the encryption status of the content. The closed lock indicates an unavailable, encrypted element. A combination of the lock and clock indicates that the content is unavailable at this time, but will be available at a later time. The open lock indicates that the content is encrypted, but has successfully been decrypted, and thus is available to the content consumer. In one embodiment, for decrypted content, the group identifier 450 for which the content was encrypted is also available to the content consumer 420.

Note that all of these icons and indicators are merely exemplary. Any alternative indicators, using colors, icons, shapes, fonts, tones, images, etc. may be utilized.

Figure 5A:
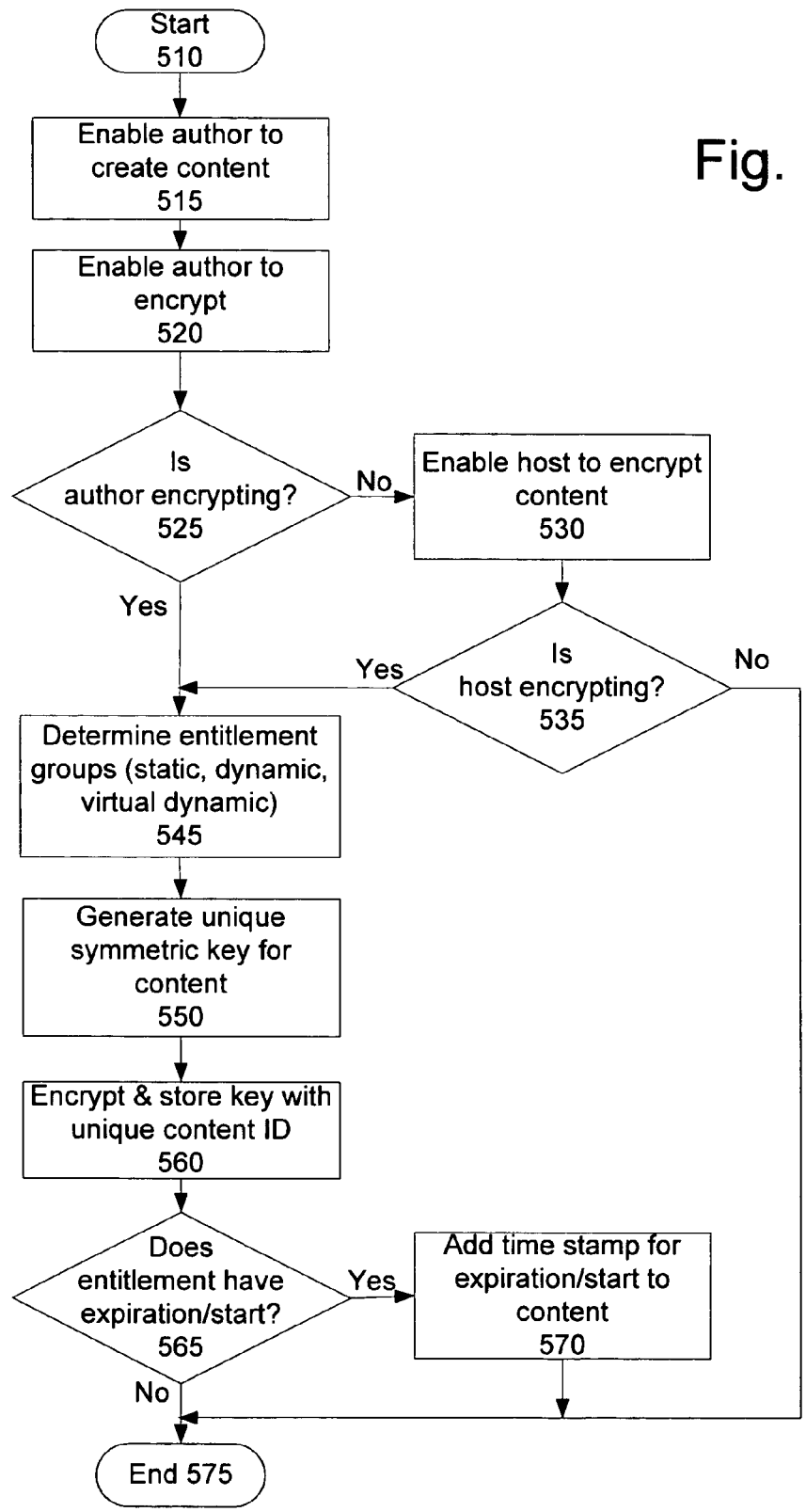
FIG. 5A is a flowchart of one embodiment of content creation using the secure content system.

FIG. 5A is a flowchart of one embodiment of content creation using the secure content system. The process starts at block 510.

At block 512, the system enables the author to create content. The content may be created or otherwise made available using any tools, on any devices. The sole criterion for it to be "content" for the purposes of the secure content service is that it be made available over a network. In one embodiment, the content may be created using a blogging tool.

At block 515, the system enables the author to encrypt the content. In one embodiment, the blogging tool may be specially modified to utilize the system. In one embodiment, the content creator has two additional "features" available. In particular, the content creator is provided with the ability to select encryption and/or signature of content. Furthermore, when the content is encrypted, the system enables content creator to select an entitlement, to define which groups may have access to the content. In another embodiment, the content creator may connect to the secure content system after the content is created using an unmodified tool, and apply the encryption and entitlement selection.

At block 517, the process determines whether the author is choosing to encrypt. In one embodiment, the author may make the affirmative choice to encrypt. In one embodiment, the author may set a default for all content created. For example, the author may set as a default that all content should be encrypted. In that case, there is no affirmative act required from the author in order to encrypt the content.

If the author is not choosing to encrypt, at block 520, the process enables the host to choose to encrypt. As above, the host may be provided with the ability to set a default for all content, all content from a particular author, or a subset of content. In one embodiment, the host and author may choose to pre-set encryption settings based on any set of preferences which can be parsed by the secure content system.

At block 522, the process determines whether the host has chosen to encrypt the content. If the host has not chosen to encrypt, then the content is not encrypted, and the process ends at block 540.

If the host or author has chosen to encrypt, the process continues to block 525.

At block 527, the entitlement to be associated with the content is identified. The entitlement may be defined as a static group, a dynamic group, or a virtual dynamic group. A static group is a listing of one or more authorized content consumers. A dynamic group is an identification of a group of content consumers which requires access to the content creator's user profile, to identify members of the group. A virtual dynamic group is an identification which requires access to the content consumer's user profile to identify membership in the group. These groups are described in more detail below. The entitlements are selected by the content creator.

At block 530, an encryption key is generated for the content. In one embodiment the key is a unique symmetric key. In another embodiment, another type of encryption key such as public/private, or other key format may be utilized.

At block 532, the content is encrypted with the key, and in one embodiment the key is stored in the secure content service, along with the unique content ID. In another embodiment, the key may be generated on request based on keying material, and the keying material is stored. In another embodiment, the key is generated using a secret owned by the secure content system, and only the unique content ID is stored. One exemplary secret which may be used to generate the key is a nonce. The nonce is a random number, in one embodiment, based on a time when the encryption request was received. The unique content ID, in one embodiment, is assigned by the secure content system. In another embodiment, an external system—such as the blogging system—may assign the unique content ID.

At block 535, the process determines whether the entitlement has an expiration or start date. In one embodiment, the author may assign different entitlements to the content, at different times. For example, the entitlement may be "open to all" initially, but change to a selected group of content consumers after a period of time. This may be useful for the temporary release of an MP3 or similar content, and then restricting it to a select subset of content consumers, or removing it. The opposite may also be true. The content may be available to a select first group at a first time, and then become available to another group at a different time. This may be useful for providing premium content to subscribers, while providing the same content automatically to non-subscribers after a specified time period has elapsed.

If the entitlement has an expiration or start, the process continues to block 537. The system adds an entitlement limitation based on a time stamp. The time stamp, in one embodiment, is based on secure content system or network time, to ensure that the content creator and content consumer's time differential does not cause problems. In one embodiment, the content may have multiple time-based entitlement limitations associated with it. The process then ends at block 540.

Figure 5B:
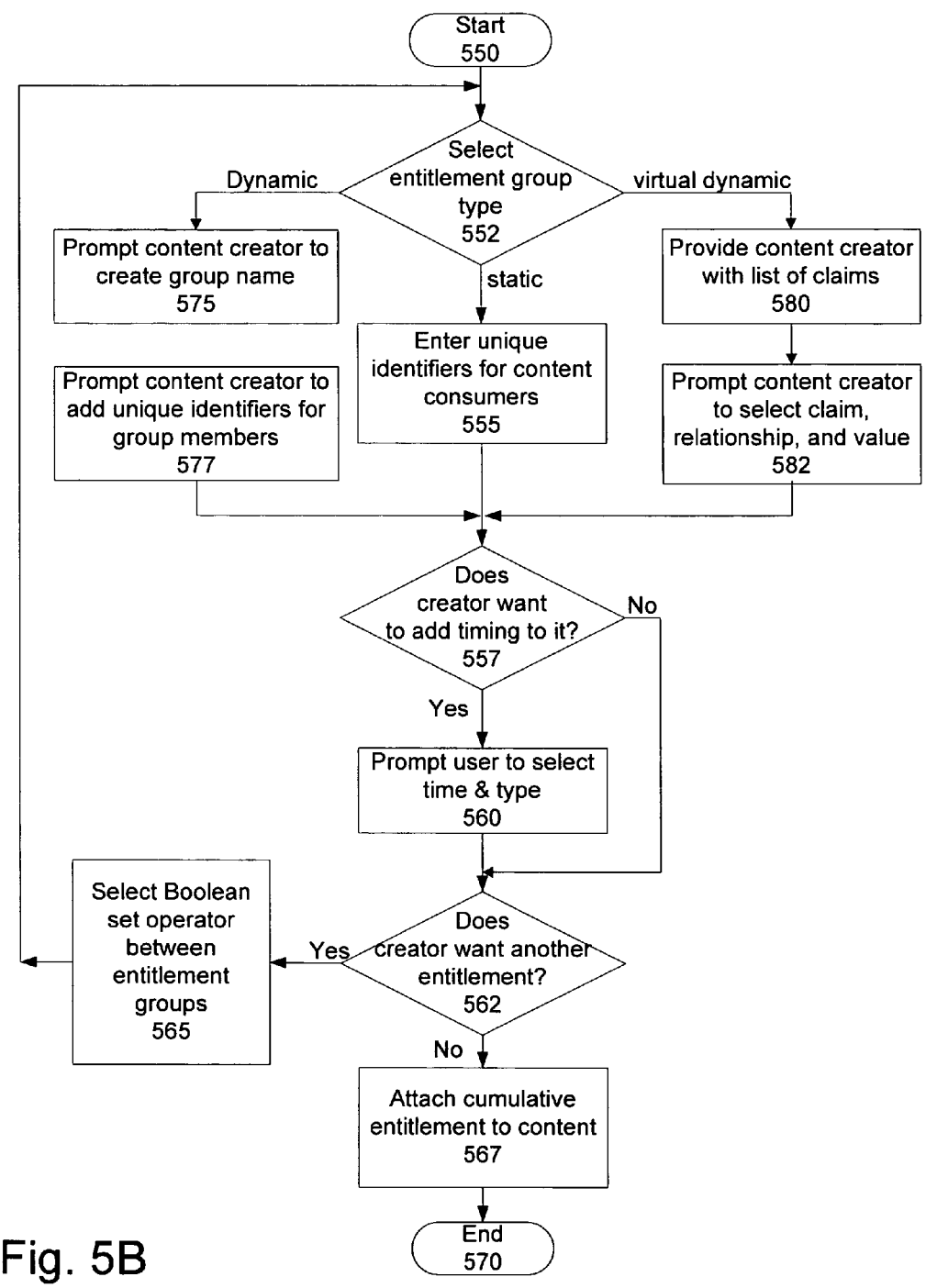
FIG. 5B is a flowchart of one embodiment of entitlement definition.

FIG. 5B is a flowchart of one embodiment of creating entitlement settings. This is a more detailed description corresponding to block 527, in FIG. 5A. The process starts at block 550. At block 552, the content creator is prompted to select an entitlement group type. The entitlement group types are: static, dynamic, and virtual dynamic. If the content creator selects static group, the process continues to block 555. At block 555, the content creator is prompted to enter one or more unique identifiers for content consumers who should be provided access to the encrypted content. At block 557, the process queries whether the content creator wants to put a time on the entitlement. If so, the process continues to block 560. At block 560, the content creator is prompted to select a time, and whether the content will be available until that time, or starting at that time. The process then continues to block 562. If the content creator did not wish to put a time on the entitlement, the process continues directly to block 562.

At block 562, the process queries the content creator whether he or she wishes to add another entitlement to the current entitlement. If so, at block 565, the process prompts the content creator to select the relationship between the entitlements. In one embodiment, the entitlements may be related by an AND (additive, such that a content consumer must meet both criteria), OR (such that the content consumer must meet one of the criteria), ANDNOT (such that the content consumer cannot be a member of the second group, even if he or she is a member of the first group) or any other Boolean relationship. The process then returns to block 552, to select an entitlement group type for the next entitlement.

If the content creator did not choose to add another entitlement, the process attaches the cumulative entitlement to the content, at block 567. The process then ends, at block 570. In one embodiment, the entitlement is encrypted by the secure content system with a separate key, such as the secure content system's public key. This ensures that the entitlement cannot be altered, and cannot be determined by someone who does not have authority to access the content. In another embodiment, the entitlement may be encrypted using the same key as the key used to encrypt the message itself. However, in this instance, the message must be decrypted prior to evaluating whether the content consumer is entitled to access the content.

If, at block 552, the content creator selected dynamic group, the process continues to block 575. Dynamic groups are defined by membership in a group. The membership may be altered by the content creator at any time, such changing access to the content after its distribution. At block 575, the content creator is prompted to select an existing group name or create a new group. If the creator chooses to create a new group, at block 577, the content creator is prompted to add the unique identifiers associated with the group members. In one embodiment, the content creator is reminded that he or she can change group membership at any time, and that such changes will affect access permissions. Otherwise, the creator may select an existing group. The process then continues to block 557, to determine whether the content creator wishes to add timing to this entitlement.

If, at block 552, the content creator selected virtual dynamic group, the process continues to block 580. Virtual dynamic groups are defined by characteristics of the content consumer. At block 580, the content creator is provided with a list of claim elements which may be constructed to produce claims to define membership in the virtual dynamic group. Claim elements include characteristics, values, and relationships. In one embodiment, the system makes available a full listing of characteristics which are either attributes or derivable from attributes which have been defined in the user profiles as its list of available claim elements. Thus, if a new attribute is added to a profile, the attribute and characteristics calculable from it are propagated to this selection list. In one embodiment, the content creator can then select a claim element at block 582, and a relationship and value for the claim element to construct a complete claim. Alternatively, claims may be entered via natural language, structured queries, or other formats. For example, the claim element may be "age," the relationship may be "greater than," and the value may be "21." Thus, the complete claim may be "age is greater than 21." In one embodiment, the relationship between the claim element and the value may be any combination of equals to, less than, greater than, and does not equal, or any other mathematical symbol.

The process then continues to block 557, to enable the content creator to add timing to this entitlement.

Figure 6:
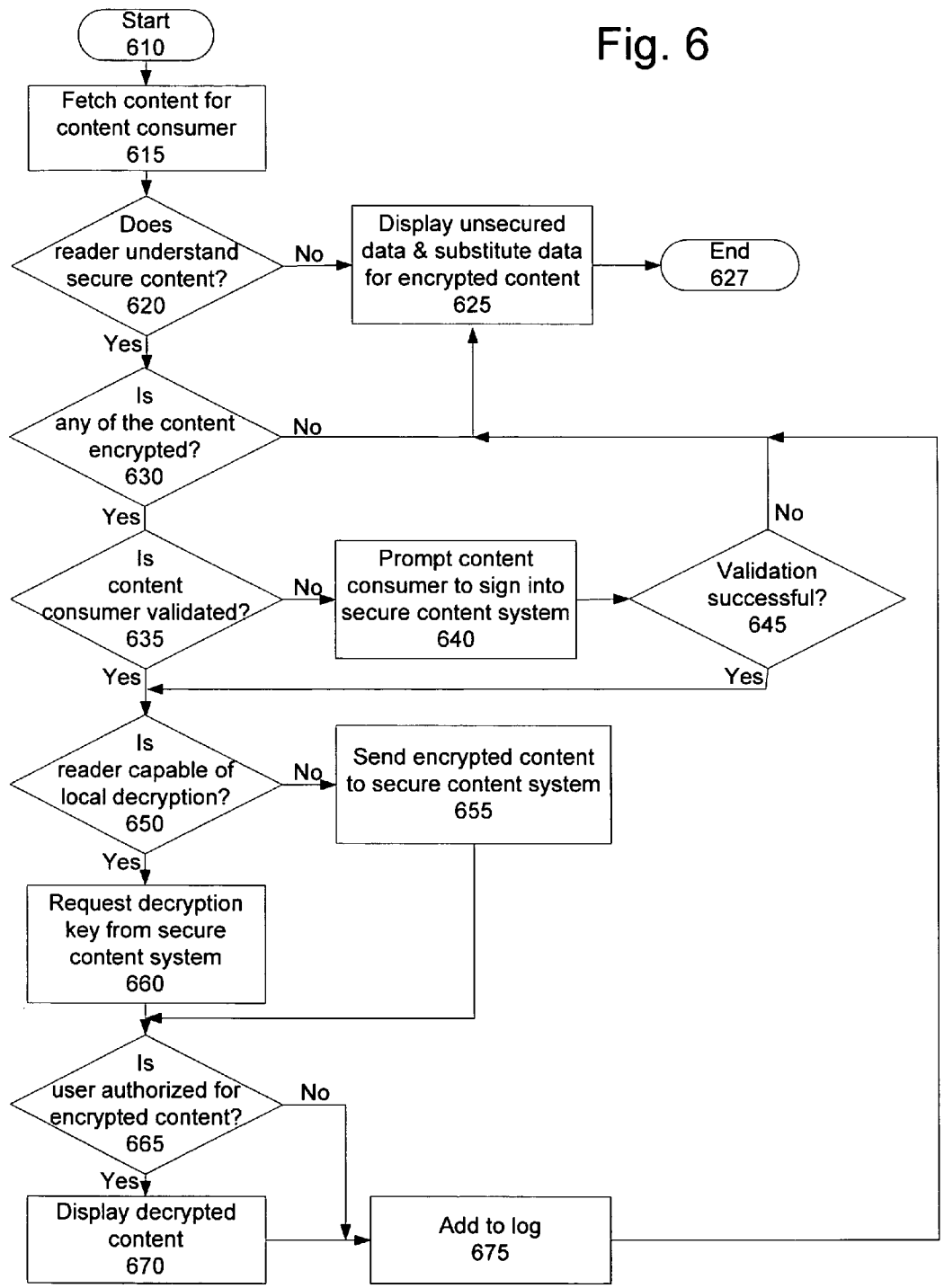
FIG. 6 is a flowchart of one embodiment of content consumption using the secure content system.

FIG. 6 is a flowchart of one embodiment of content consumption using the secure content system. The process starts at block 610. At block 615, the content is fetched on behalf of the consumer. In one embodiment, this may be a done in response to consumer logging on to a web site, reading a blog, reading content through an aggregator, or otherwise attempting to access content which may include one or more content elements that may be encrypted/signed.

At block 620, the process determines whether the reader understands secure content. Some readers cannot understand secure content. If the content consumer's reader is one of these, the unsecured plain text data is displayed, and substitute data for the encrypted content is shown, at block 625. The substitute content, as noted above, may be defined by the content creator. In one embodiment, the substitute content default is "This content is encrypted. Please visit <www.example.com> to download a reader capable of providing access to encrypted content." The process then ends at block 627.

If the reader understands secure content, the process continues to block 630. At block 630, the process determines whether any of the content fetched by the reader is encrypted. If none of the content is encrypted, the process continues to block 625, and displays the content.

If at least some of the content is encrypted, the process continues to block 635.

At block 635, the process determines whether the content consumer is validated. A validated content consumer has a user profile registered with the secure content service, and is connected to the secure content service. Connection, in one embodiment comprises being logged in/authenticated. In one embodiment when a consumer logs in, the secure content service uses a session cookie for authentication.

If the content consumer is not validated, the process at block 640 prompts the content consumer to sign into the secure content system. At block 645, the process determines whether the validation was successful. If the validation was not successful, the process continues to block 625, where the plain text data is displayed, and substitute data is displayed for the encrypted content. If the validation was successful, the process continues to block 650. If the content consumer was found to be validated at block 635, the process continues directly to block 650.

At block 650, the process determines whether the reader is capable of local decryption. If the reader is capable of local decryption, the reader requests the decryption key from the secure content system, at block 660. In one embodiment, the request simply includes the unique content ID associated with the content. However, since the content consumer is validated to the secure content service, the request itself, in one embodiment automatically includes the content consumer's self-identification. If the reader is not capable of local decryption, the reader sends the encrypted content to the secure content system, at block 655. Again, this request includes the content consumer's self-identification. In another embodiment, the server may separately request the cookie.

At block 665, the process determines whether the content consumer is authorized for the content. This is described in more detail below. If so, the decrypted content is displayed, at block 670. Otherwise, the access, or failed access, is then added to the log, at block 675. As noted above, each access is logged.

The process then continues to block 625, where the decrypted content and unsecured content is displayed. In one embodiment, this process is used for each encrypted content element fetched by the content consumer. In another embodiment multiple encrypted content elements may be batched for this process. Thus, even if the content consumer is authorized for one content piece, there may be other content pieces that remain encrypted. In one embodiment, this process is transparent to the content consumer.

Figure 7:
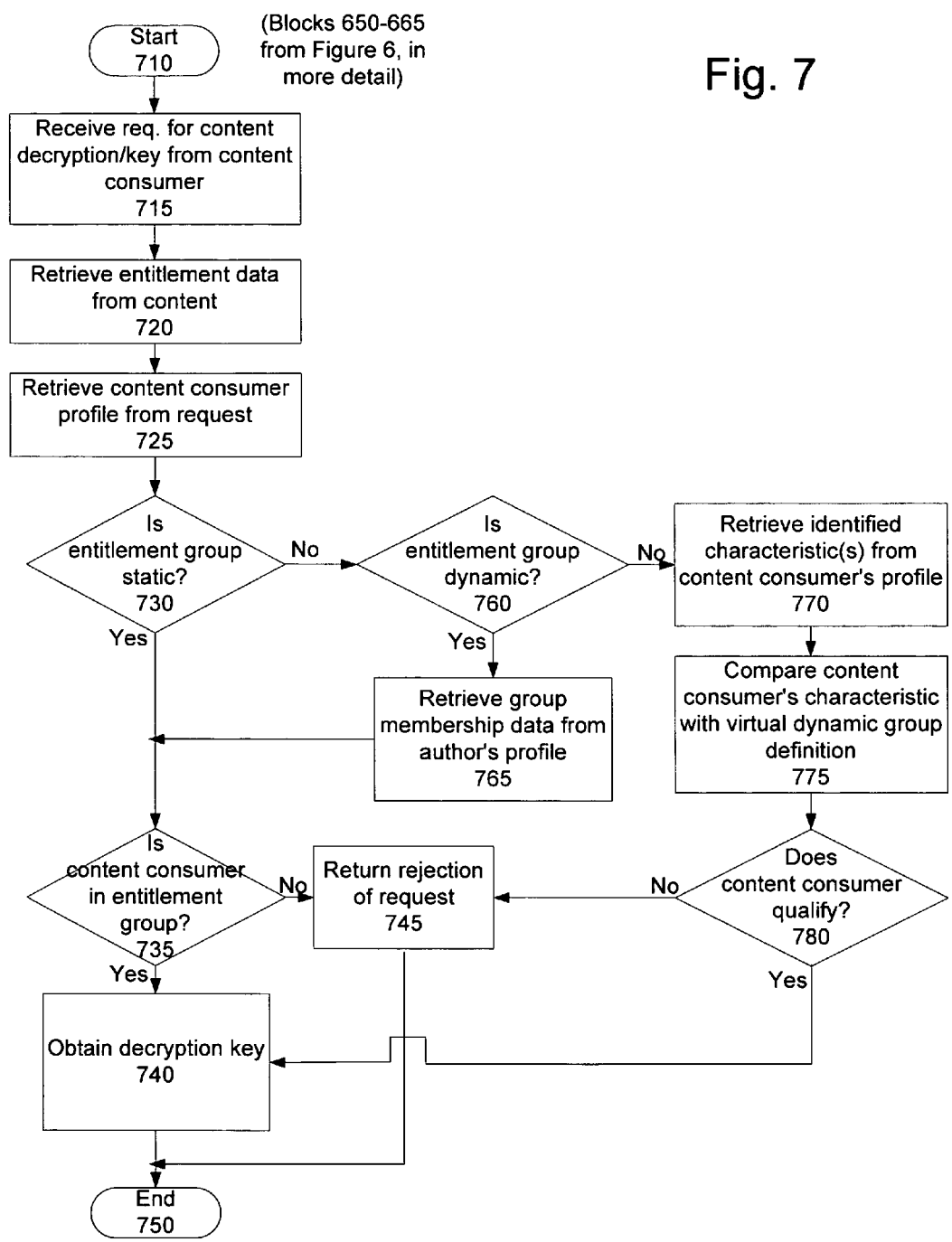
FIG. 7 is a flowchart of one embodiment of verifying content consumer entitlement.

FIG. 7 is a flowchart of one embodiment of verifying content consumer entitlement. The process starts at block 710. This flowchart corresponds to blocks 650-665 of FIG. 6. Thus, the process starts when a validated content consumer requests access to a content piece.

At block 715, the request for a content decryption or decryption key is received from the reader. As noted above, the request may just request the decryption key if the reader is capable of decrypting, and has the processing power. Otherwise, the decrypted content is requested.

At block 720, the entitlement data is retrieved from the content. In one embodiment, the entitlement data may be included in the request received from the reader. In another embodiment, the system may go out to the encrypted content to retrieve the entitlement data.

At block 725, the content consumer's profile is retrieved from the request. In one embodiment, this step is performed after determining the access group.

At block 730, the process determines whether the access group is static. A static access group names content consumers, such that the listed identities in the access group can simply be compared to the known and verified identity of the content consumer. This comparison is performed at block 735. If the consumer is not in the access group, at block 745 a rejection is returned to the reader. In one embodiment, no data is returned to the reader, and the reader system assumes that if no data is received the consumer was not entitled to the content. In another embodiment, the encrypted data message is returned. In another embodiment a failure message is returned. The process then ends at block 750.

If the consumer is authorized, at block 740, the decryption key is obtained. In one embodiment, the decryption key is retrieved from a key store. In another embodiment, the decryption key is generated on-the-fly. This is described in more detail below. The system then returns either the decrypted data or the decryption key to the consumer, in accordance with the request, using a secure channel. The process then ends at block 750.

If, at block 730, the process determined that the entitlement group is not a static group, the process continues to block 760. At block 760, the process determines whether the entitlement group is dynamic. Note that this does not include "virtual dynamic groups," only "dynamic groups."

Dynamic groups are groups that are defined by the content creator, which have a variable membership. The membership of the dynamic group is created by the content creator, and stored in the content creator's profile. Thus, at block 765, the group membership data is retrieved from the content creator's profile. Note that this group membership may differ from the membership at the time the entitlement was originally created. Thus, the content creator may alter reading access to encrypted content by altering the group membership.

After the group membership data is retrieved, the process continues to block 735, and the process determines whether the consumer is in the entitlement group.

If, at block 760, the process determined that the entitlement group was not dynamic, then the process continues to block 770. This means that the entitlement group is virtual dynamic. Virtual dynamic groups are defined by consumer profile characteristics. For example, a virtual dynamic group may be "members over the age of 21." Any characteristic or combination of characteristics, described in more detail below, may be used.

At block 770, the identified characteristics, identified by the virtual dynamic group, are retrieved from the content consumer's profile. At block 775, the identified characteristic's values are compared with the values from the consumer's profile. That this may require an intermediate calculations, in one embodiment. For example, the characteristic retrieved may be the content consumer's birth date, and the characteristic used for filtering may be the content consumer's age. Therefore, the system may calculate characteristics derived from the stored fields of the user profile prior to making the comparison. In one embodiment, if there is a characteristic for which the consumer does not have a matching data entry—for example user-defined profile extensions—the default is that there is no match. For example, if the content consumer's profile does not indicate birth date or age, the system assumes that an age requirement is not met.

At block 780, the process determines whether the consumer's profile data matches the characteristic requirements associated with the content. If it does not, the process continues to block 745, and a rejection is returned. If the consumer does qualify, the process continues to block 740, and the decryption key is retrieved. The process then ends at block 750.

In one embodiment, a single piece of content may have multiple cumulative or alternative entitlements. For example, the entitlement may be "member of group 'my friends' AND over age 21." Alternatively, the entitlement may be "Joe" OR "member of group coworkers." Of course, multiple qualifications of the same type (i.e. "over age 21" and "lives in California") may be layered as well. The entitlement may also include time limitations, for example "time>past Apr. 15, 2006 AND member of group X." For layered entitlements, the above process is repeated until a "No" is found or the entitlements have all been met.

Figure 8:
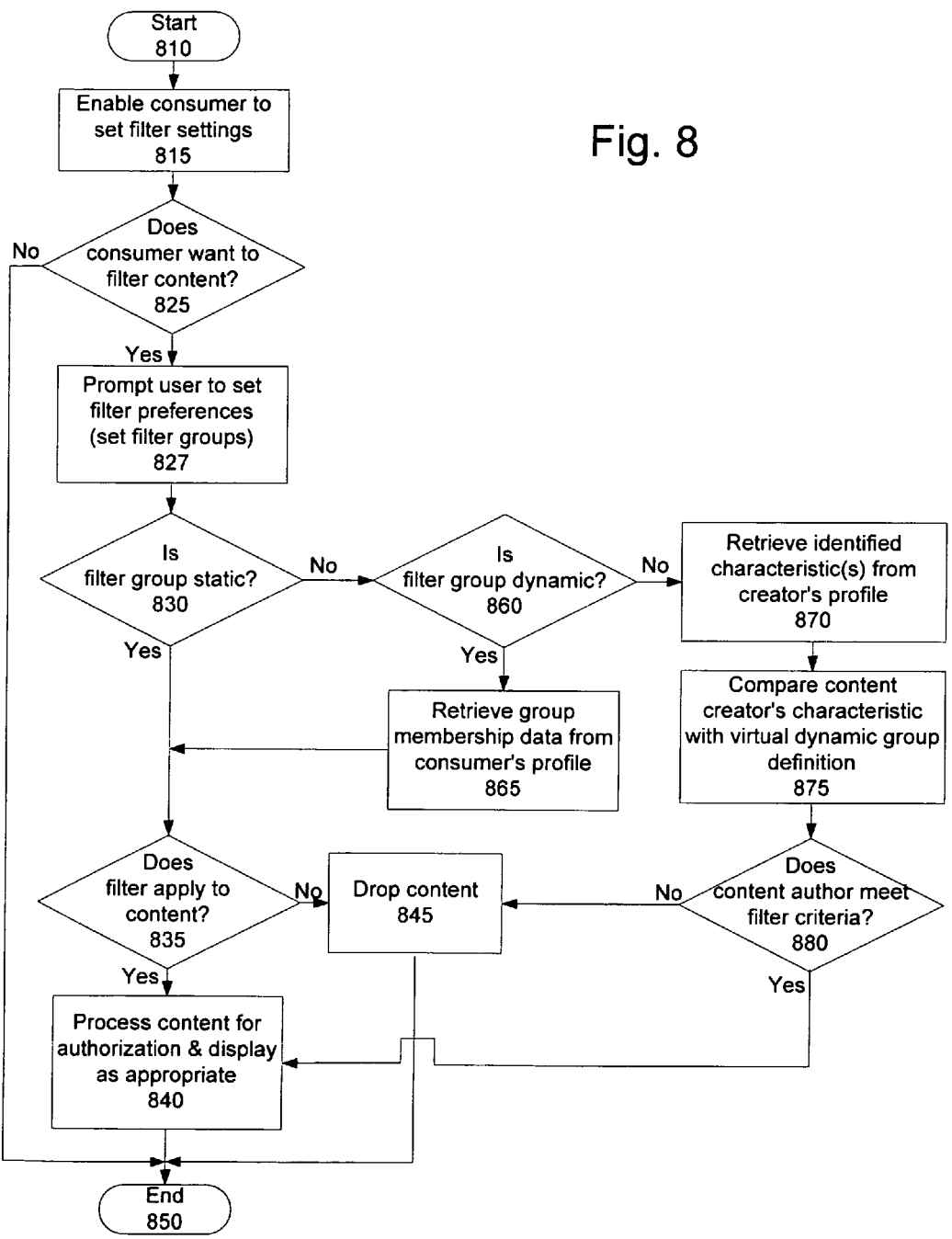
FIG. 8 is a flowchart of one embodiment of content consumer filtering.

FIG. 8 is a flowchart of one embodiment of content consumer filtering. The process enables a content consumer to set preferences for receiving content. Note that while the content consumer may set preferences, this does not affect whether or not the consumer is entitled to read (decrypt) of the content. Blocks 815 through 827 illustrate the setting of preferences. In one embodiment, this is done in the content consumer's profile.

The process starts at block 810. At block 815, the system enables the consumer to set filter settings.

The process, at block 825, determines whether the consumer wishes to set filters. If the consumer does not wish to set filters, the process ends at block 850. If the consumer does wish to set filters, at block 827, the consumer is prompted to set filter groups. As discussed above with respect to entitlements, the filter groups may be static (i.e. a list of identified content creators), dynamic (a named group having a dynamically adjustable member list, the named group attached to the content consumer's own profile), or virtual dynamic (defined by content creator characteristic, where the characteristic is a part of the content creator's user profile, or can be derived from the user profile.) In one embodiment, the filter group may also include filters based on the content being read, rather than the content creator. Such filters may be the traditional filters based on words or metadata of the content, or may be based on the entitlements attached to the content. FIG. 5B illustrates one embodiment of setting entitlements. A similar process may be used for setting filter preferences.

Blocks 830 through 880 illustrate one embodiment of using the filter preferences. This corresponds to block 349 of FIG. 3. In one embodiment, this filtering may be performed after verifying that the content consumer is eligible for the content, but prior to decrypting the content. Alternatively, this filtering may take place prior to determining the content consumer's entitlement. Alternatively, the filtering may be done after all other steps, just prior to displaying the content. The specific ordering is irrelevant and may change or a case-by-case basis.

The process, at block 830, determines whether the filter group is static. If the filter group is static, as determined at block 830, the process at block 835 determines whether the filter applies to the content. All content, in one embodiment, is identified by author. Therefore, the author's identity, group membership, and characteristics may be used to filter receipt of data. This may be useful, for example, in a pre-constructed feed or a joint blog where content from multiple authors is available. The consumer can, by selecting the static filter group, read a subset of the available feed/blog/content. If the filter does not apply to the content, at block 845 the content is not displayed. In one embodiment the missing content is indicated in some manner, for example a <filtered> icon. In another embodiment, it is simply removed. If the filter applies, at block 840, the content is processed for authorization and displayed. As noted above, simply because the consumer's filter indicates that the content should be displayed does not affect the authorization requirements, described above.

If, at block 830, the filter group was not static, the process continues to block 860. The process, at block 860, determines whether the filter group is dynamic. If so, the group membership data is retrieved from content consumer's profile. The process then continues to block 835, to determine based on the listed membership of the group whether the filter applies to the content.

If the filter group is not static or dynamic, then it is virtual dynamic, i.e. characteristic based. This may be useful, for example, if a content consumer wishes to only read data from authors having a certain level of authentication or trust associated with them.

At block 870, the identified characteristics specified in the filter are retrieved from the content creator's profile. At block 875, the content creator's characteristic information is compared with the characteristic values specified in the filter. Note that this may require an intermediate calculation. For example, the characteristic retrieved may be the content consumer's birth date, and the characteristic used for filtering may be the content consumer's age. Therefore, the system may, at block 875 calculate characteristics derived from the stored fields of the user profile.

At block 880, the process determines whether the author meets the criteria of the filter. If so, the process continues to block 840 to perform further processing. If the author does not meet the filter criteria, the content is filtered, at block 845.

Figure 9:
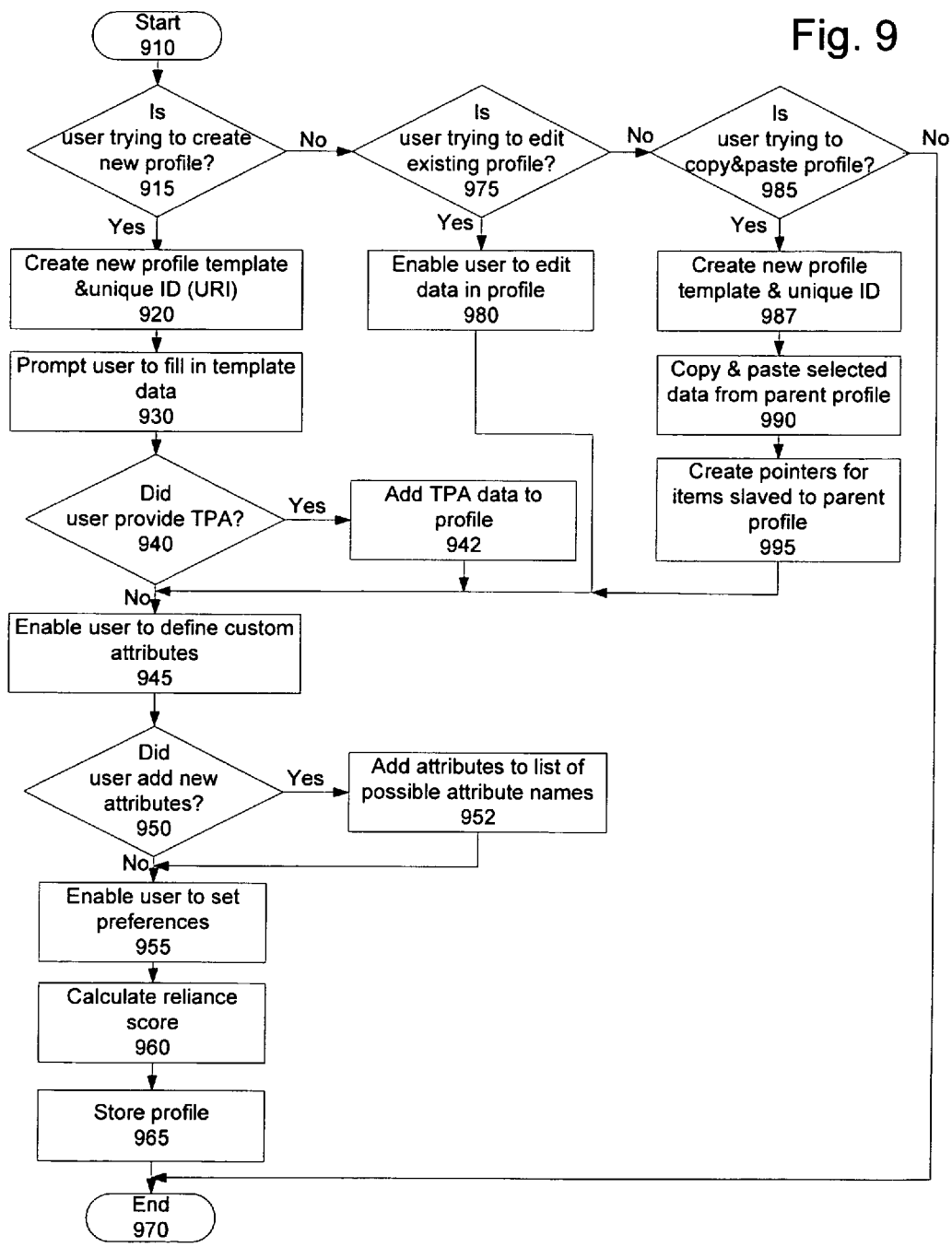
FIG. 9 is a flowchart of one embodiment of creating and selectively copying or linking a user profile to generate another user profile.

FIG. 9 is a flowchart of one embodiment of creating, editing, and copy & pasting a user profile. The process starts at block 910. In one embodiment, this process is available through a web interface. In one embodiment this process is only available after the user has provided at least a minimal level of authentication—for example proof that the user is not a robot.

At block 915, the process determines whether the user wants to create a new profile. If so, the process continues to block 920. At block 920, a new profile template is created and a unique identifier (in one embodiment a universal resource indicator (URI)) is assigned to the new user profile. At block 930, the user is prompted to fill in template data. The template data, in one embodiment, may include multiple attributes, including user defined attributes. In one embodiment, all attributes which have been created by any user are available for the user creating the new profile. In one embodiment a user may be required to fill in a minimum set and/or number of attributes.

At block 940, the process determines whether the user provided third party authentication (TPA) for any of the data. If so, the third party authentication is added to the user profile at block 942. In one embodiment, the third party authentication may be a certified datum, a signature, or any other type of third party validation of data. The process then continues to block 945.

At block 945, the process enables the user to define custom attributes. These attributes may be single attributes (i.e. favorite car) or attribute groups (favorite foods, which may include sub-attributes such as favorite sweet, favorite drink, favorite salad dressing, and further sub-sub-attributes such as ingredient requirements, etc.). In one embodiment, the user may designate the newly created attribute as "private." Such private attributes are not propagated/disclosed outside of the user's profile.

At block 950, the process determines whether the user added new public attributes that did not exist in the system. If so, at block 952, in one embodiment the attributes are added to the list of possible attribute names. In one embodiment a basis "acceptability" check is made for new attributes. In one embodiment the system also attempts to verify that the newly created attribute does not exist under another name. If either of these problems occurs, in one embodiment, the user is notified. In one embodiment an administrator is notified.

In another embodiment new custom attributes are approved by an administrator or authorized user prior to being made available to others. In another embodiment, a certain number of users must have created the same custom attribute prior to it being added to the system. In one embodiment, subsequent users creating profiles have the newly added attributes available to them. The process then continues to block 955.

At block 955, the user is permitted to set preferences. Preferences may include anomalous behavior and real-time alert monitoring, display preferences, filtering/encryption/signature preferences, profile access preferences, dynamic group definitions, and any other available settings.

At block 960, a reliance score is calculated for the profile. The reliance score, in one embodiment reflects the system's overall "trust" in the user's profile data. For example, if the user profile simply includes a name and an email address this may be considered fairly insecure. In comparison, a profile that includes credit cards, passport data, and certified identity data is considered to have a very high reliance score.

At block 965, the profile is stored, and the process ends, at block 970. Note that at this point, the user profile becomes available in accordance with the user-set profile access settings.

If, at block 975 the process found that the user was not trying to create a new profile, the process continues to block 975.

At block 975, the process determines whether the user is trying to edit an existing profile. If so, at block 980, the editing is enabled. As noted above, in one embodiment this requires authentication with the secure content service, to ensure that only the profile owner can edit the profile. Editing may, in one embodiment, include adding, deleting, and changing any of the attributes which exist in the secure content system, at the current time. In one embodiment, if new attributes have been created between the time when the initial profile was generated and now, the user editing the profile has access to all those new attributes.

The process then continues to block 945, to enable the user to add further custom attributes.

If, at block 975, the process found that the user was not attempting to edit a profile, the process continues to block 985. At block 985, the process determines whether the user is trying to copy&paste a profile. The concept of "copy&paste" indicates that the user is attempting to create a child profile which is designed to inherit at least a portion of the data from a parent profile. This enables a user, for example, to maintain a separate professional and personal identity, without requiring the user to reenter and reconfirm all the data previously entered. If the user is not trying to copy&paste, the process continues to block 970, and ends.

If the user is trying to copy&paste, the process continues to block 987. At block 987, a new profile is created, with a new unique identifier.

At block 990, the process enables the user to copy&paste selected data from the original profile to the new profile. The user may copy&paste all of the content, or a subset of the content. In one embodiment, the user may select data to copy&paste by grouping (i.e. the user may propagate all user-defined and static data.)

At block 995, in one embodiment, the process enables the user to create pointers for items slaved to the parent profile. In one embodiment, certain data may be simply linked to a parent profile's data, causing it to automatically update when the parent profile's data is updated. For example, the home address is likely to change simultaneously for all profiles associated with an individual. By enabling the pointer/slaving, the system removes the onus on the user to keep each of a plurality of profiles up to date.

The process then continues to block 945, to enable the user to create additional custom attributes for this profile.

Figure 10:
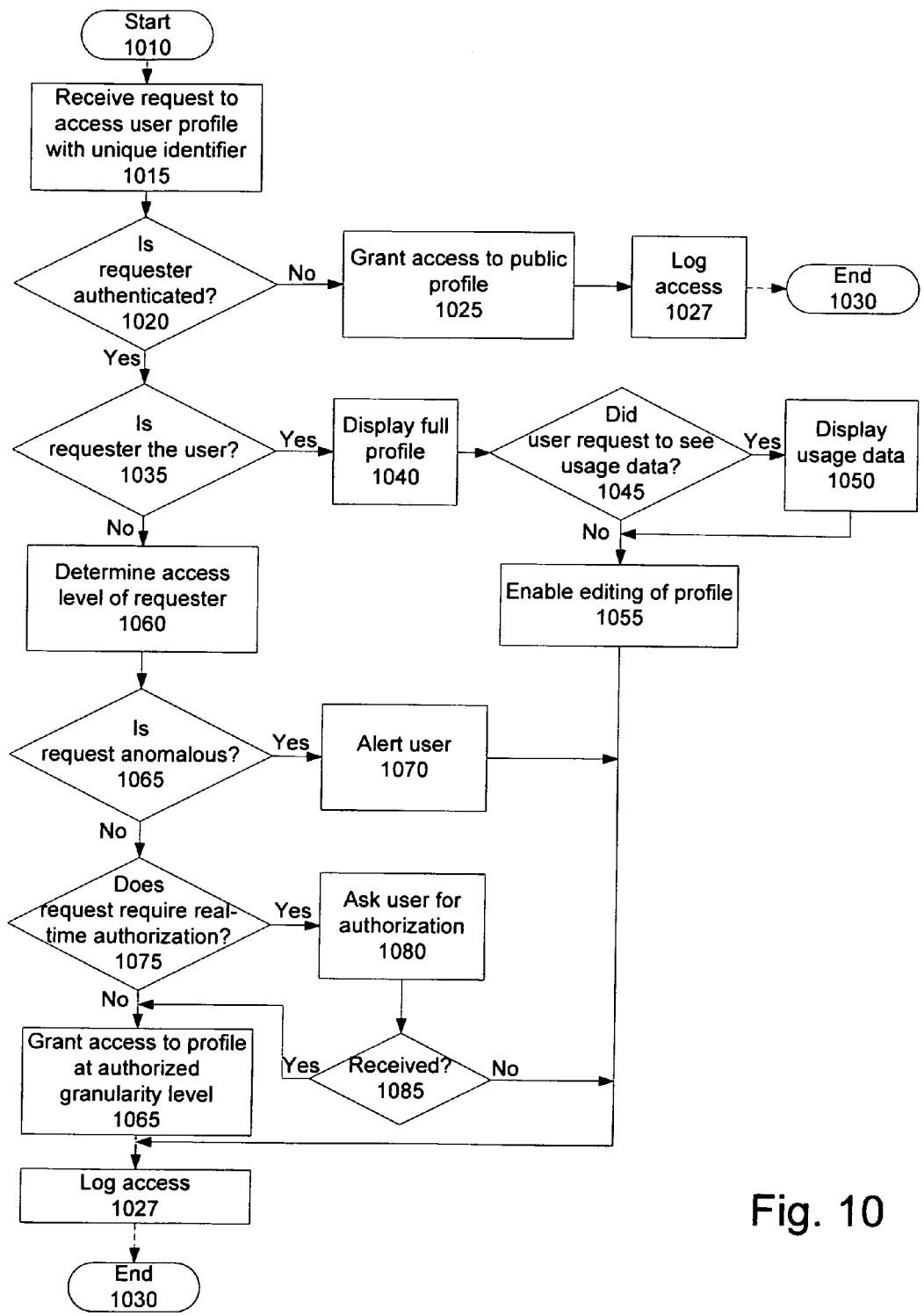
FIG. 10 is a flowchart of one embodiment of utilizing a user profile.

FIG. 10 is a flowchart of one embodiment of utilizing a user profile. The process starts at block 1010. At block 1010, a request for access to the user profile is received. In one embodiment, the access request uses a unique identifier, such as a universal resource indicator (URI). This request may be by an individual attempting to view the profile. It may also be by a reader or authoring tool accessing the profile for authentication or entitlement/filtering purposes as described above. Additionally, since the profile may be used for general identification, the access may be for another purpose. For example, the access may be a request to authorize a credit card purchase, where the credit card is purportedly associated with the profile.

At block 1020, the process determines whether the requester is authenticated. If the requester is not authenticated, the system grants access to the public profile, at block 1025. The access is logged, at block 1027. The process then ends at block 1030. As noted above, the user may define various portions of the user profile as accessible by the public, various authorization levels, individuals, groups, etc. In one embodiment, complete granularity is provided for the user.

If the requester is authenticated, the process continues to block 1035. At block 1035, the process determines whether the user is the requester (i.e. whether the user is attempting to access is or her own profile). If so, the process, at block 1040, displays the full profile. At block 1045, the process determines whether the user has requested to see usage data. If so, at block 1050, the usage data is displayed. In one embodiment, usage data is fetched from a central log, as discussed above.

At block 1055, editing of the profile is enabled. Thus, the user can change the user defined data in the user profile, as well as the settings associated with the user data. The settings may include encryption settings for content creation, alerts, and real-time authorization settings. The process then continues to block 1027, and the access is logged.

If, at block 1035, it was determined that the requester is not the user, the process continues to block 1060. At block 1060, the access level of the requester is determined. In one embodiment, this is controlled by the owner of the user profile. In one embodiment, this may further be controlled by a subscription level of the requester. Alternative control mechanisms may be implemented.

At block 1065, the process determines whether the request is anomalous. Anomalous requests are those that do not fit a normal pattern. Like a credit card company, the system monitors for anomalous behaviors. For example, an access request from a service provider that the user does not seem to be affiliated with would be considered anomalous. For example, if the user has historically been associated with a first cell phone provider, and there is an access request of credit card data from a different cell phone provider, it may be flagged as anomalous. In one embodiment, anomalous behavior is determined based on the usage data observed for the user.

If the request appears anomalous, at block 1070, the user is alerted. In one embodiment, the access request is also denied. The process then continues to block 1027, to log the access attempt. In one embodiment, the user may authorize access in response to the alert. In one embodiment, the user's settings may include setting all accesses as anomalous until authorized by the user. This enables the user to create a white list.

If the request was not considered anomalous at block 1065, the process continues to block 1075. At block 1075, the process determines whether the request requires real-time authorization. The user may set certain types of access as requiring real-time authorization. For example, a request for a credit card may trigger such a real-time authorization requirement.

If the request requires real-time authorization, the process continues to block 1080. At block 1080, the user is asked for authorization. In one embodiment, the user's contact preference is used for this contact. At block 1085, the process determines whether authorization is received. If no authorization is received, the process continues to block 1027, to log the access attempt, without having granted access to the user's profile. In one embodiment, the requester may be granted limited access, without the authorization-required aspects, even if no authorization is received.

If the request does not require authorization, the process at block 1065 grants access to the user profile at the granularity level associated with the access level of the requester. As noted above, in one embodiment this is based on user preference settings within the profile itself. At block 1027, the access to the user profile, and its outcome, are logged. The process then ends at block 1030.

Figure 11:
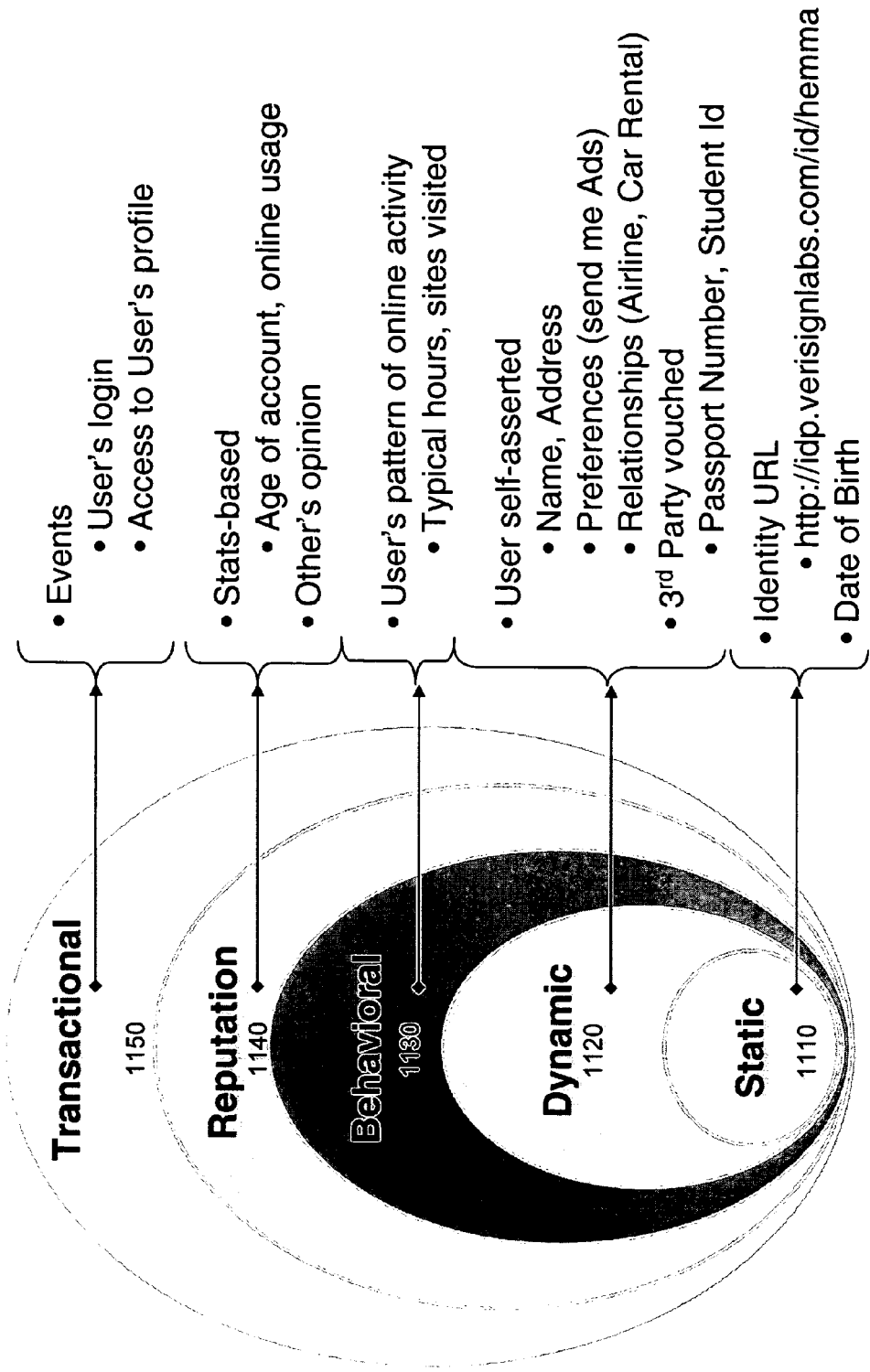
FIG. 11 is an exemplary illustration of the categories of a user profile.

FIG. 11 is an exemplary illustration of the categories of a user profile. The static data 1110 includes the identity URL, which is permanently associated with the profile, as well as date of birth. Dynamic data 1120 may include user self-asserted data, such as name, address, preferences, relationships, and third party vouched data (passport number, student ID, etc.) Behavioral data 1130 is based on the user's pattern of online activity. This may include typical hours, sites visited, etc. Reputation data 1140 may include statistic based data, such as age of account, online usage, as well as opinion based data, which includes others' opinions about the user. Transactional data 1150 includes events, such as user log-in, and accesses to user's data. These categories together build up a consistent picture of the user, and are useful for understanding how groups can be defined. For example, a virtual dynamic group may set "online usage>30 comments per month." Thus, the virtual dynamic group criteria may include characteristics from any and all of the categories.

FIG. 12 is a diagram of one embodiment of a user profile, illustrating in more detail some of the possible fields. The user profile is defined by the user profile ID 1210. In one embodiment, the user profile ID is actually a unique identifier, or unique resource indicator (URI). Note that, in one embodiment, the user profile is fully extensible. That is, the user may define custom data fields. There is static and pseudo-static data, which may include name 1220, date of birth 1225, address 1230, gender 1235, etc. In one embodiment, some of this data may be third party validated (TPV). The third party validation may include the identity of the validator, a BLOB (Binary Large Object) which may include a certificate, a SAML token, or another indication of the third party validation.

The profile may further include other user defined data. User defined data may include pseudonyms 1045, credit card 1250s, hobbies 1255, and extensible fields 1290. Extensible fields 1290 allow a user to define new attributes and associated data. For example, a user may wish to include in his or her profile that the user's native language is Greek. The user can create a new profile attribute defined "native language" and enter the data. In one embodiment, once the user has created the profile attribute "native language," this profile attribute becomes available to other users as a selectable attribute for filtering, setting entitlements, and editing profiles. In one embodiment, the user may designate a newly created attribute as "private." Such private attributes are not propagated/disclosed outside of the secure content system. However, in one embodiment, the user may still set access criteria to this attribute. In one embodiment, newly created attributes become part of the system list of attributes only once a critical mass of user profiles include the attribute. For example, in one embodiment, once at least 0.1% of profiles or 100 profiles, include the newly created attribute, it is included in the list of system attributes available to users when they create a new profile.

In one embodiment, the profile may further include the user's settings for anomalous activity alerts 1260. Anomalous activity alerts 1260 enable the user to set the "paranoia level" on alerts. Some users prefer a white list (i.e. requiring approval from each requester prior to granting access) while others prefer a blacklist (i.e. only excluding known bad actors). The user may set the anomalous activity alerts 1260. In one embodiment the system provides default settings that may be overridden by a user. Similarly, real-time alerts 1265 may be set by the user. In one embodiment both types of alerts may be turned off. Access granularity definition 1285 enables the user to set access levels for various requesters.

The profile further includes a link to the transactional data 1270 associated with the user. In one embodiment, this data is dynamically retrieved from the events database, which logs each event within the secure content service. Behavioral data 1275 and reputation data 1280 may also be included. In one embodiment, behavioral data 1275 and reputation data 1280 may be third party validated.

The profile may further include dynamic groups 1295. As noted previously, users can define dynamic groups, and use the group definition for restricting access to content published by the user. These dynamic groups 1295 have a membership defined by the user. In one embodiment, the user may import groups from various outside sources, such as LDAP systems (Lightweight Directory Access Protocol), email systems, etc. In one embodiment, the dynamic group definition may be permanently slaved to an LDAP or similar system. That is, in one embodiment, the membership definition in the dynamic groups 1295 in the user's profile may point to another data source.

The profile may further include content filters 1299. Content filters 1299 define the filters applied to content prior to its presentation to the user. This feature is described in more detail above with respect to FIG. 9.

As noted above, the profile described is fully extensible. The attributes discussed here are merely exemplary.

Figure 13:
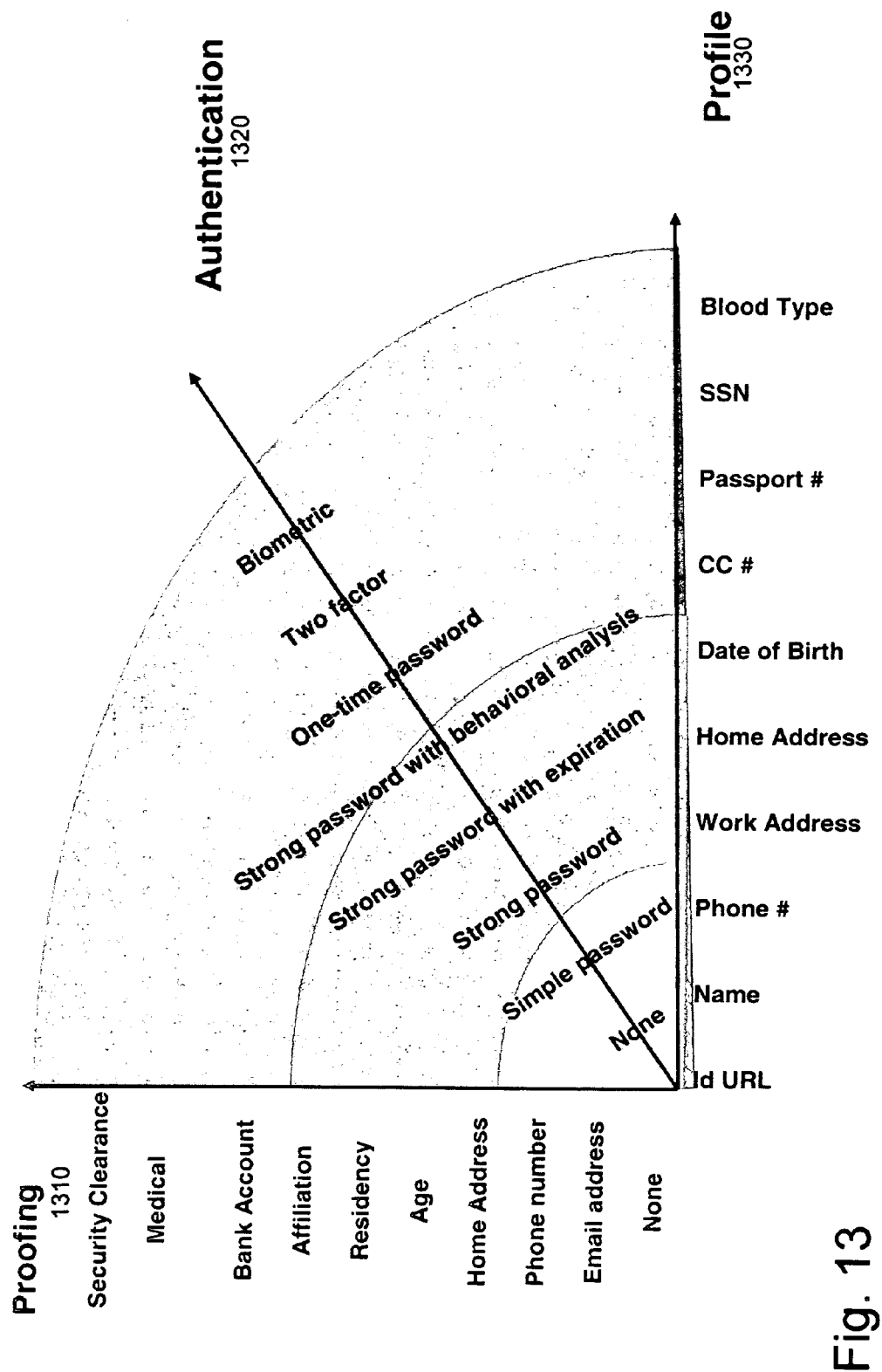
FIG. 13 illustrates an example of the continuum of identity system characteristics.

FIG. 13 illustrates an example of the continuum of identity system characteristics. As discussed with respect to the user profile, the user's data may be authenticated by a third party. But in addition to third party authentication, there is a continuum of identity system characteristics. There are three dimensions to this continuum, proofing 1310, profile 1330, and authentication 1320. Proofing 1310 is the level of authentication conducted on the user, e.g. a government security clearance check is performed and security clearance status is given to the user. This can range from none to a high security clearance level. Profile 1330 illustrates the amount of data contained in the profile. This can range from simply having the profile ID (URI) to including passport number, social security number, blood type, etc. Authentication 1320 focuses on the ongoing user validation required to access their own user profile, or the secure content system, or to perform single-sign-on to other websites. The authentication may range from none, to simple password, smart cards, all the way to multiple biometrics. As these factors all travel outward in three dimensions, the level of surety regarding the accuracy of the data in the profile increases. In one embodiment, as the profile 1330 and proofing 1310 grows, the level of authentication 1320 should also grow, because the cost of unauthorized access to the profile data becomes more expensive.

In one embodiment, a single value is assigned to the place along the continuum where a particular user profile resides.

This reliance score indicates how much confidence the system has in the accuracy of the profile information. The reliance score may, in one embodiment, be used as a virtual dynamic group criterion for access to data. In one embodiment, the reliance score may have multiple sub-values, for example for profile, authentication, and proofing.

Figure 14:
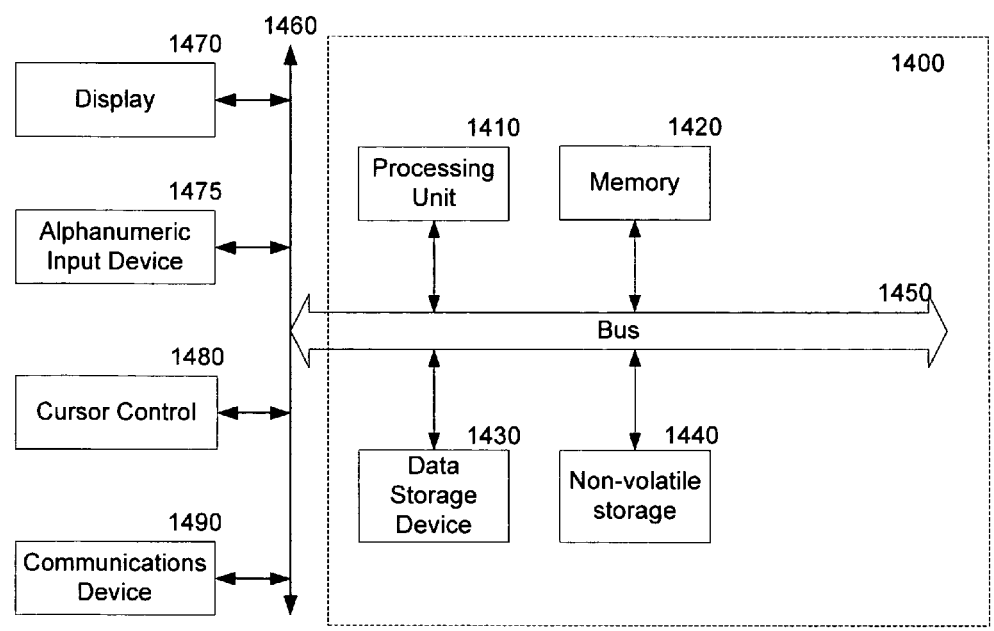
FIG. 14 is a block diagram of one embodiment of a computer system which may be used with the present invention.

FIG. 14 is a block diagram of one embodiment of a computer system which may be used with the present invention. It will be apparent to those of ordinary skill in the art, however that other alternative systems of various system architectures may also be used.

The data processing system illustrated in FIG. 14 includes a bus or other internal communication means 1415 for communicating information, and a processor 1410 coupled to the bus 1415 for processing information. The system further comprises a random access memory (RAM) or other volatile storage device 1450 (referred to as memory), coupled to bus 1415 for storing information and instructions to be executed by processor 1410. Main memory 1450 also may be used for storing temporary variables or other intermediate information during execution of instructions by processor 1410. The system also comprises a read only memory (ROM) and/or static storage device 1420 coupled to bus 1415 for storing static information and instructions for processor 1410, and a data storage device 1425 such as a magnetic disk or optical disk and its corresponding disk drive. Data storage device 1425 is coupled to bus 1415 for storing information and instructions.

The system may further be coupled to a display device 1470, such as a cathode ray tube (CRT) or a liquid crystal display (LCD) coupled to bus 1415 through bus 1465 for displaying information to a computer user. An alphanumeric input device 1475, including alphanumeric and other keys, may also be coupled to bus 1415 through bus 1465 for communicating information and command selections to processor 1410. An additional user input device is cursor control device 1480, such as a mouse, a trackball, stylus, or cursor direction keys coupled to bus 1415 through bus 1465 for communicating direction information and command selections to processor 1410, and for controlling cursor movement on display device 1470.

Another device, which may optionally be coupled to computer system 1400, is a communication device 1490 for accessing other nodes of a distributed system via a network. The communication device 1490 may include any of a number of commercially available networking peripheral devices such as those used for coupling to an Ethernet, token ring, Internet, or wide area network. The communication device 1490 may further be a null-modem connection, or any other mechanism that provides connectivity between the computer system 1400 and the outside world. Note that any or all of the components of this system illustrated in FIG. 14 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1450, mass storage device 1425, or other storage medium locally or remotely accessible to processor 1410.

It will be apparent to those of ordinary skill in the art that the system, method, and process described herein can be implemented as software stored in main memory 1450 or read only memory 1420 and executed by processor 1410. This control logic or software may also be resident on an article of manufacture comprising a computer readable medium having computer readable program code embodied therein and being readable by the mass storage device 1425 and for causing the processor 1410 to operate in accordance with the methods and teachings herein.

The present invention may also be embodied in a handheld or portable device containing a subset of the computer hardware components described above. For example, the handheld device may be configured to contain only the bus 1415, the processor 1410, and memory 1450 and/or 1425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1410, a data storage device 1425, a bus 1415, and memory 1450, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 1410. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
an authoring tool including an input device to enable a user to create a feed of content and to selectively encrypt at least a portion of the content as it is added to the feed of content to create clear-text content and encrypted content in the feed, the encryption including an entitlement with the feed of content, the entitlement restricting access to the encrypted content;
the authoring tool to further enable encryption of the entitlement;
a reading tool including an output device to access various content, the reading tool to enable an integrated reading of clear-text content and encrypted content in the feed;

a secure content service to compare, using a microprocessor, a profile of a reading user to the entitlement;

upon a successful authorization of the reading user, identify a filter specification specified at least in part in the encrypted entitlement;

perform at least one of actions (i) determine the encrypted content meets the filter specifications related to release time and (ii) apply the specified filter to restrict access rights of encrypted content; and provide, using a microprocessor, a decryption key to the authorized reading user to decrypt the encrypted content.

2. The system of claim 1, wherein the entitlement comprises one or more of the following: a static group including an authorized individual user, a dynamic group including a predefined user group having at least one user, a virtual dynamic group wherein group membership is specified by one or more characteristics in a user profile.

3. The system of claim 2, wherein the entitlement is defined by a characteristic specified in or derivable from a reader's user profile.

4. The system of claim 2, wherein the entitlement is defined by a characteristic specified in or derivable from an author's user profile.

5. The system of claim 1, wherein the reading tool further comprises:

a message substitution logic to insert an encryption-appropriate message for display when a non-authorized user attempts to view an encrypted entry.

6. The system of claim 1, wherein the authoring tool further comprises:

a timing logic to enable the setting of an entitlement period for a specific duration.

7. A non-transitory computer-readable storage medium with an executable program stored thereon, wherein the program instructs a microprocessor to perform the following steps:

providing a feed of content;

selecting a portion of the content to be encrypted as it is added to the feed of content;

including an entitlement with the feed of content, wherein the entitlement restricts access to the encrypted content;

encrypting the selected portion of the content; encrypting the entitlement included with the feed of content;

accessing a portion of content not selected to be encrypted;

comparing a profile of a reading user to the entitlement;

upon a successful authorization of the reading user, identifying a filter specification specified at least in part in the encrypted entitlement;

performing at least one of actions (i) determine the encrypted content meets the filter specifications related to release time and (ii) apply the specified filter to restrict access rights of encrypted content; and providing, using a microprocessor, a decryption key to the authorized reading user to decrypt the encrypted content.

* * * * *